(12) United States Patent
Kitazawa et al.

(10) Patent No.: US 12,136,351 B2
(45) Date of Patent: Nov. 5, 2024

(54) INFORMATION PROCESSING APPARATUS AND INFORMATION PROCESSING METHOD

(71) Applicant: SONY CORPORATION, Tokyo (JP)

(72) Inventors: Yuji Kitazawa, Tokyo (JP); Naoki Shibuya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 705 days.

(21) Appl. No.: 17/250,759

(22) PCT Filed: Jun. 4, 2019

(86) PCT No.: PCT/JP2019/022099
§ 371 (c)(1),
(2) Date: Mar. 1, 2021

(87) PCT Pub. No.: WO2020/054145
PCT Pub. Date: Mar. 19, 2020

(65) Prior Publication Data
US 2021/0319715 A1    Oct. 14, 2021

(30) Foreign Application Priority Data
Sep. 11, 2018  (JP) ................................. 2018-169321

(51) Int. Cl.
*G09B 15/00* (2006.01)
*G06F 3/01* (2006.01)
*G10H 1/00* (2006.01)

(52) U.S. Cl.
CPC ............ *G09B 15/00* (2013.01); *G06F 3/016* (2013.01); *G10H 1/0008* (2013.01);
(Continued)

(58) Field of Classification Search
CPC ...... G09B 15/00; G06F 3/016; G10H 1/0008; G10H 1/0058; G10H 2210/091;
(Continued)

(56) References Cited

U.S. PATENT DOCUMENTS 5,581,484 A * 12/1996 Prince ..................... G06F 3/014
340/407.1
10,629,175 B2 * 4/2020 Yan ...................... G10H 1/0008
(Continued)

FOREIGN PATENT DOCUMENTS

CN  107978303 A  5/2018
CN  109791740 A  5/2019
(Continued)

OTHER PUBLICATIONS

International Search Report and Written Opinion of PCT Application No. PCT/JP2019/022099, issued on Sep. 3, 2019, 14 pages of ISRWO.

*Primary Examiner* — Christina M Schreiber
(74) *Attorney, Agent, or Firm* — CHIP LAW GROUP

(57) ABSTRACT

Provided is an information processing apparatus that is detachable from a human body. The information processing apparatus includes a control unit that generates feedback information that provides feedback. The generation of the feedback information is based on information that is based on a strength or a weakness of a keystroke of a musical instrument.

16 Claims, 14 Drawing Sheets

(52) U.S. Cl.
CPC ..... *G10H 1/0058* (2013.01); *G10H 2210/091* (2013.01); *G10H 2220/326* (2013.01); *G10H 2220/355* (2013.01); *G10H 2220/391* (2013.01); *G10H 2220/395* (2013.01)

(58) Field of Classification Search
CPC ....... G10H 2220/326; G10H 2220/355; G10H 2220/391; G10H 2220/395
USPC .......................................................... 84/467
See application file for complete search history.

(56) References Cited

U.S. PATENT DOCUMENTS

| | | | | |
|---|---|---|---|---|
| 2001/0039870 | A1* | 11/2001 | Shimaya | G09B 15/023 84/478 |
| 2016/0210950 | A1* | 7/2016 | McPherson | G10H 1/34 |
| 2018/0342229 | A1* | 11/2018 | Yan | G10H 1/344 |
| 2021/0104213 | A1* | 4/2021 | Furuya | G09B 15/08 |
| 2021/0319715 | A1* | 10/2021 | Kitazawa | G10H 1/0008 |
| 2022/0398937 | A1* | 12/2022 | Furuya | G09B 5/06 |
| 2023/0054973 | A1* | 2/2023 | Nishioka | G06T 7/292 |

FOREIGN PATENT DOCUMENTS

| | | | | | |
|---|---|---|---|---|---|
| JP | 2001-242863 | A | | 9/2001 | |
| JP | 2007078724 | A | * | 3/2007 | |
| JP | 2008-122644 | A | | 5/2008 | |
| JP | 2011-22599 | A | | 2/2011 | |
| JP | 2012-128152 | A | | 7/2012 | |
| JP | 2017-062347 | A | | 3/2017 | |
| JP | 2017138992 | A | * | 8/2017 | ............. G06T 19/00 |
| WO | 2017/029915 | A1 | | 2/2017 | |
| WO | 2018/068203 | A1 | | 4/2018 | |
| WO | 2018/068711 | A1 | | 4/2018 | |

* cited by examiner

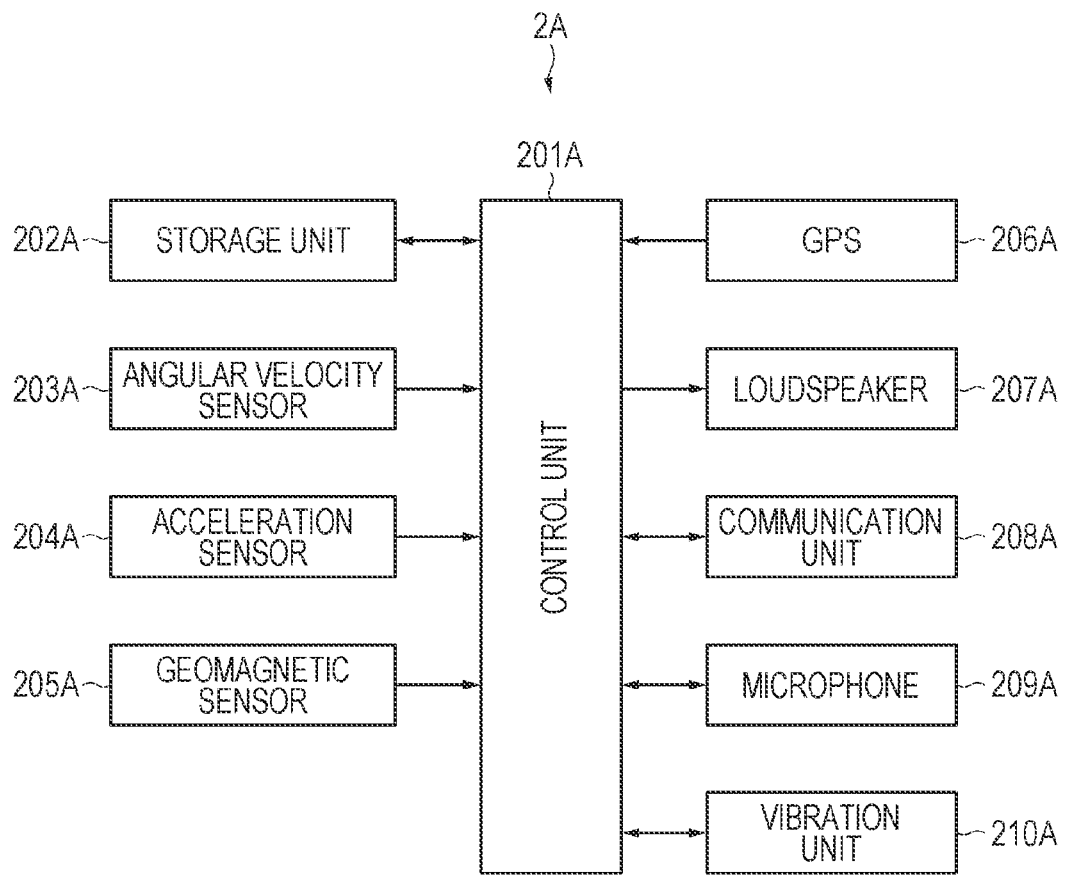
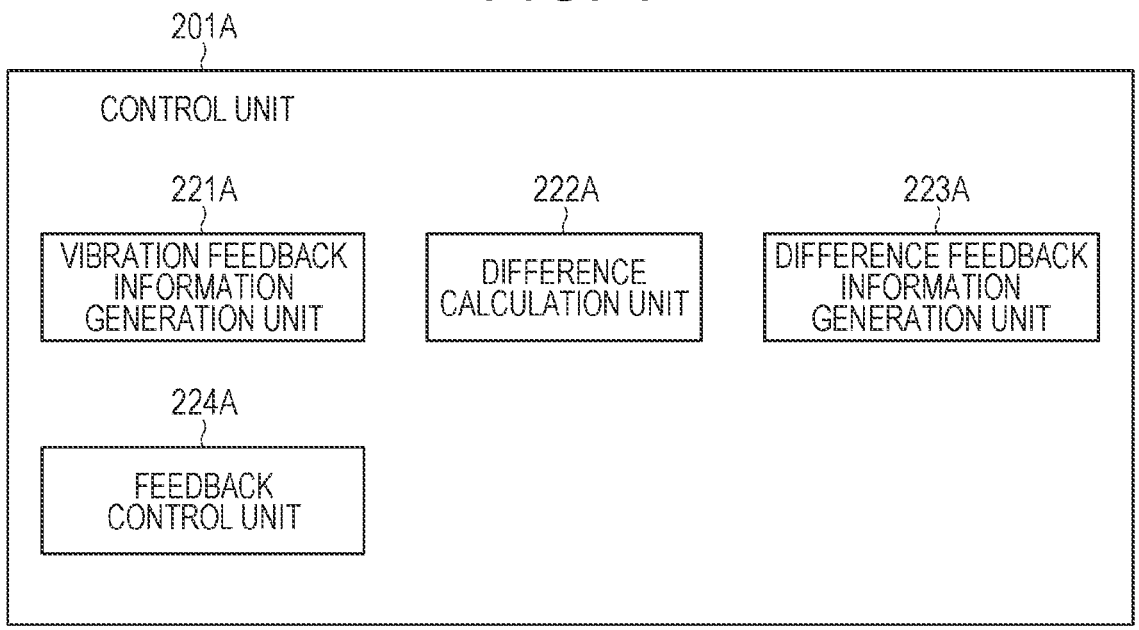

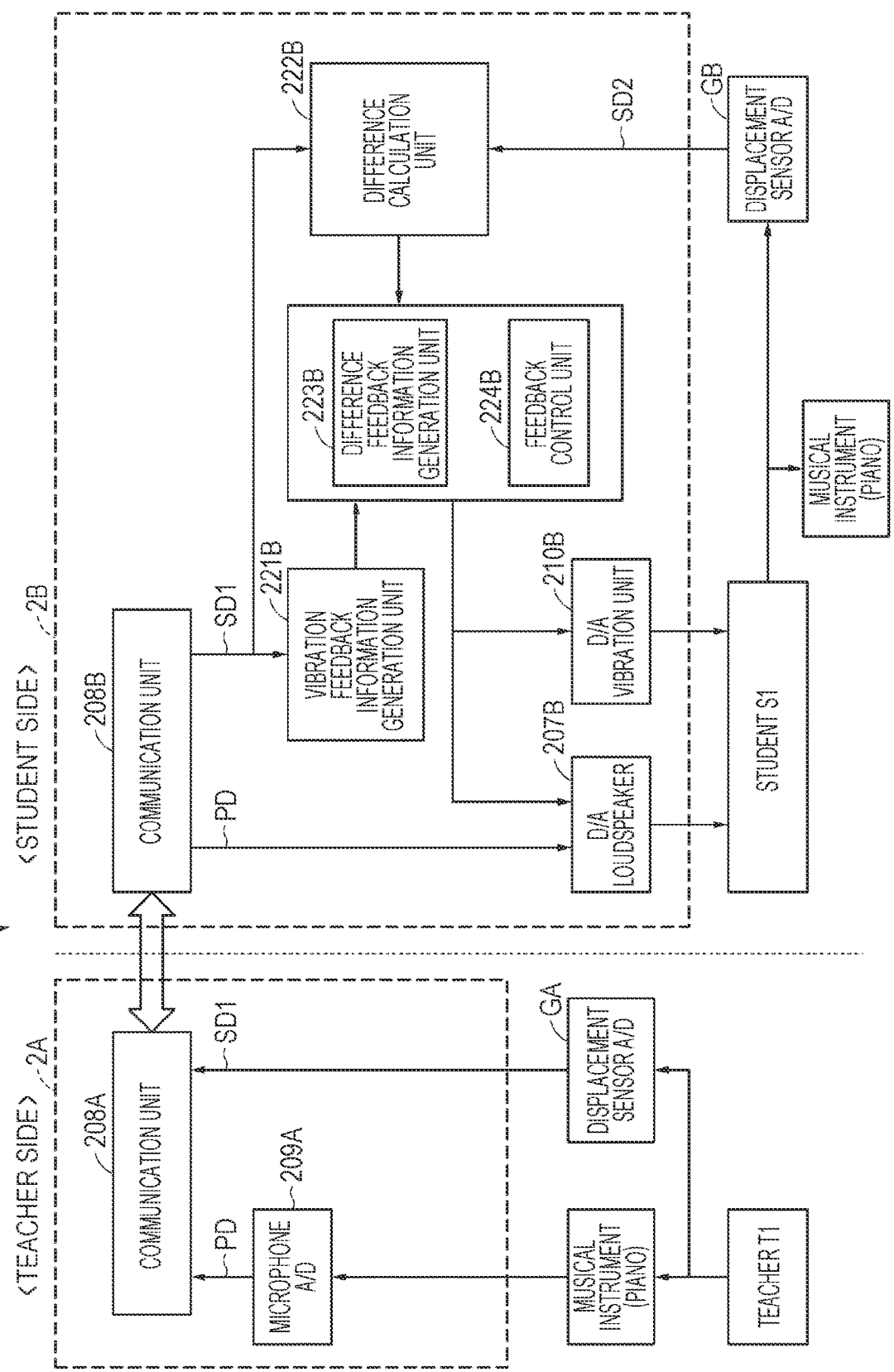

FIG. 7A
LEFT LITTLE FINGER
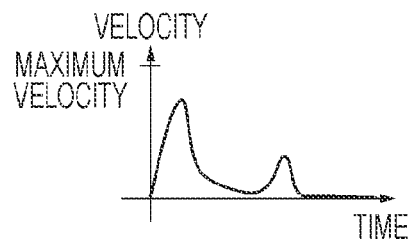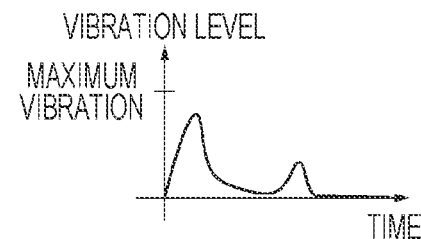
LEFT RING FINGER
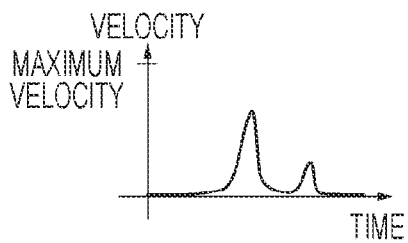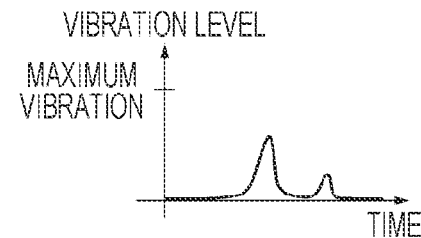
(PREPARE FOR ALL FINGERS)
FIG. 7B
(PREPARE FOR ALL FINGERS)

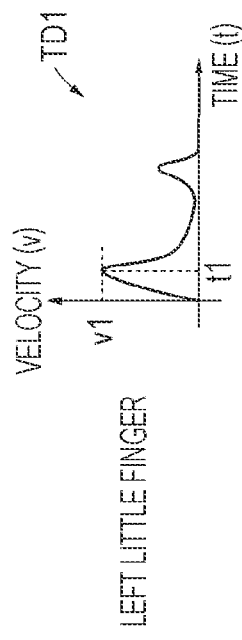
FIG. 8A
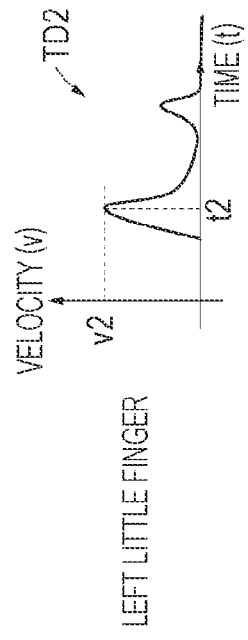
FIG. 8B
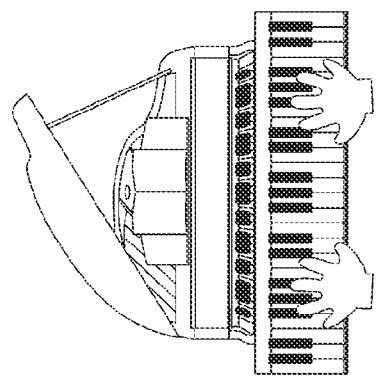
FIG. 8C
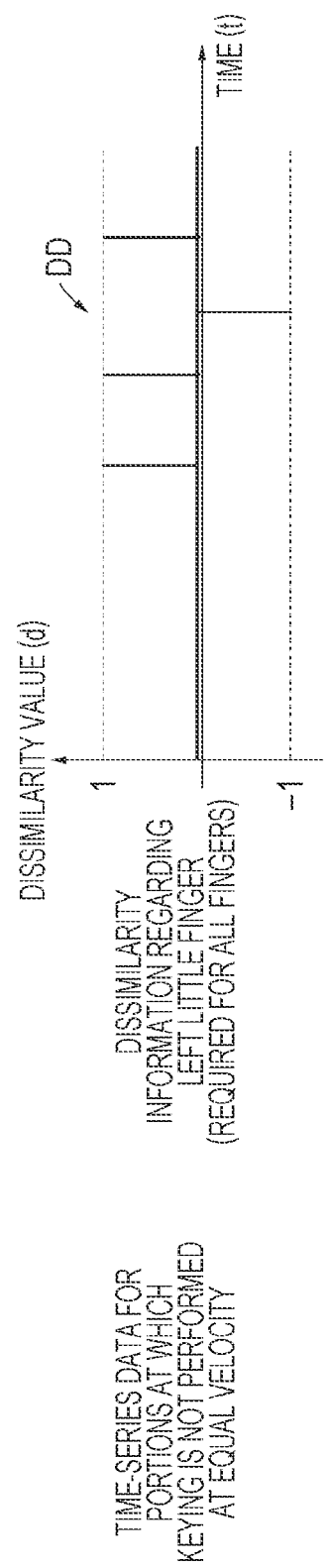

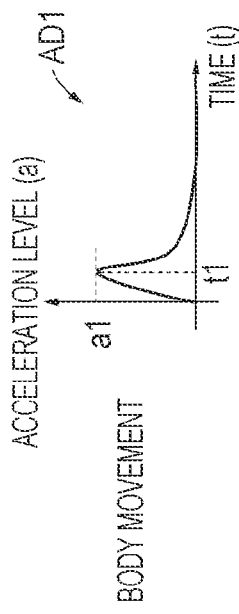
FIG. 15A
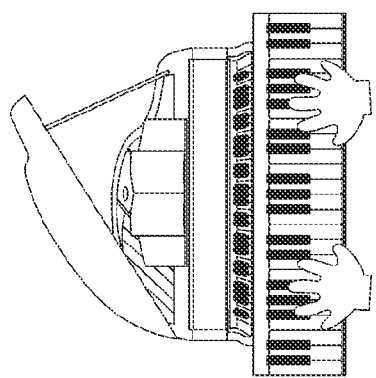
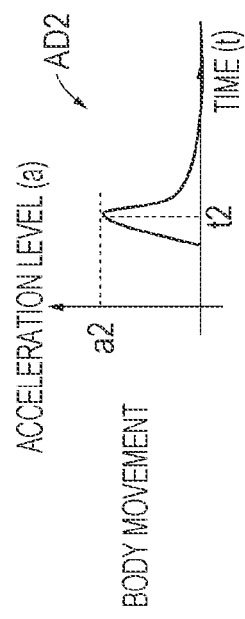
FIG. 15B
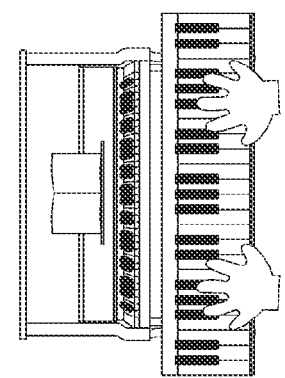
FIG. 15C
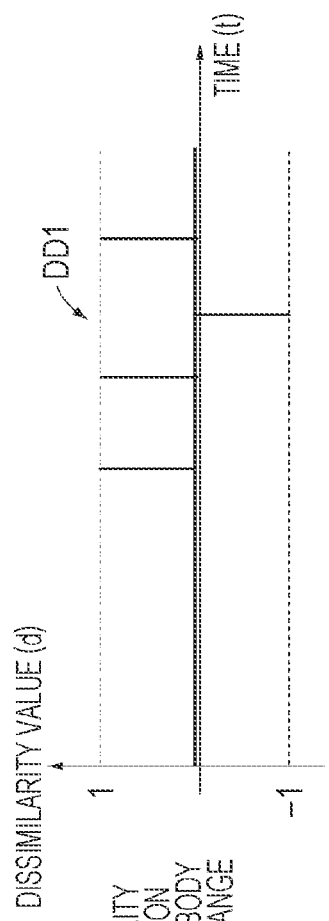

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/022099 filed on Jun. 4, 2019, which claims priority benefit of Japanese Patent Application No. JP 2018-169321 filed in the Japan Patent Office on Sep. 11, 2018. Each of the above-referenced applications is hereby incorporated herein by reference in its entirety.

TECHNICAL FIELD

The present disclosure relates to an information processing apparatus, an information processing method, and a program.

BACKGROUND ART

A musical instrument enabling strength/weakness of keystrokes to be changed is known. For example, Patent Document 1 described below describes an automatic playing piano enabling strength/weakness of keystrokes to be changed.

CITATION LIST

Patent Document

Patent Document 1: Japanese Patent Application Laid-Open No. 2011-22599

SUMMARY OF THE INVENTION

Problems to be Solved by the Invention

For example, when a student takes a lesson from a professional or an advanced person regarding the performance of the musical instrument described in Patent Document 1, it is desired that appropriate feedback be provided to the student.

One of objects of the present disclosure is to provide an information processing apparatus, an information processing method, and a program enabling appropriate feedback to be provided to a student in a system in which a lesson of a musical instrument or the like is performed.

Solutions to Problems

The present disclosure is
an information processing apparatus
detachable from a human body, including
a control unit that generates feedback information that
provides feedback in accordance with information
based on strength/weakness of a keystroke of a musical
instrument, for example.
The present disclosure is
an information processing method in an information processing apparatus detachable from a human body,
including
a control unit's generating feedback information that
provides feedback in accordance with information
based on strength/weakness of a keystroke of a musical
instrument, for example.
The present disclosure is
a program causing a computer to execute an information
processing method in an information processing apparatus detachable from a human body, the information
processing method including
a control unit's generating feedback information that
provides feedback in accordance with information
based on strength/weakness of a keystroke of a musical
instrument, for example.

BRIEF DESCRIPTION OF DRAWINGS

FIG. 3 is a block diagram illustrating an example of an internal configuration of the information processing apparatus according to the embodiment.

FIG. 4 is a diagram illustrating an example of functional blocks of a control unit according to the embodiment.

FIG. 6 is a diagram for describing an example of processing performed in a remote lesson system according to a first embodiment.

FIGS. 7A and 7B are diagrams for describing an operation example of a vibration feedback information generation unit according to the embodiment.

FIG. 8A illustrates an example of time-series data based on a teacher's performance, FIG. 8B illustrates an example of time-series data based on a student's performance, and FIG. 8C illustrates an example of dissimilarity data.

FIGS. 15A, 15B, and 15C are diagrams referred to when processing for calculating a difference in acceleration data is described in the third embodiment.

MODE FOR CARRYING OUT THE INVENTION

Figure 1:
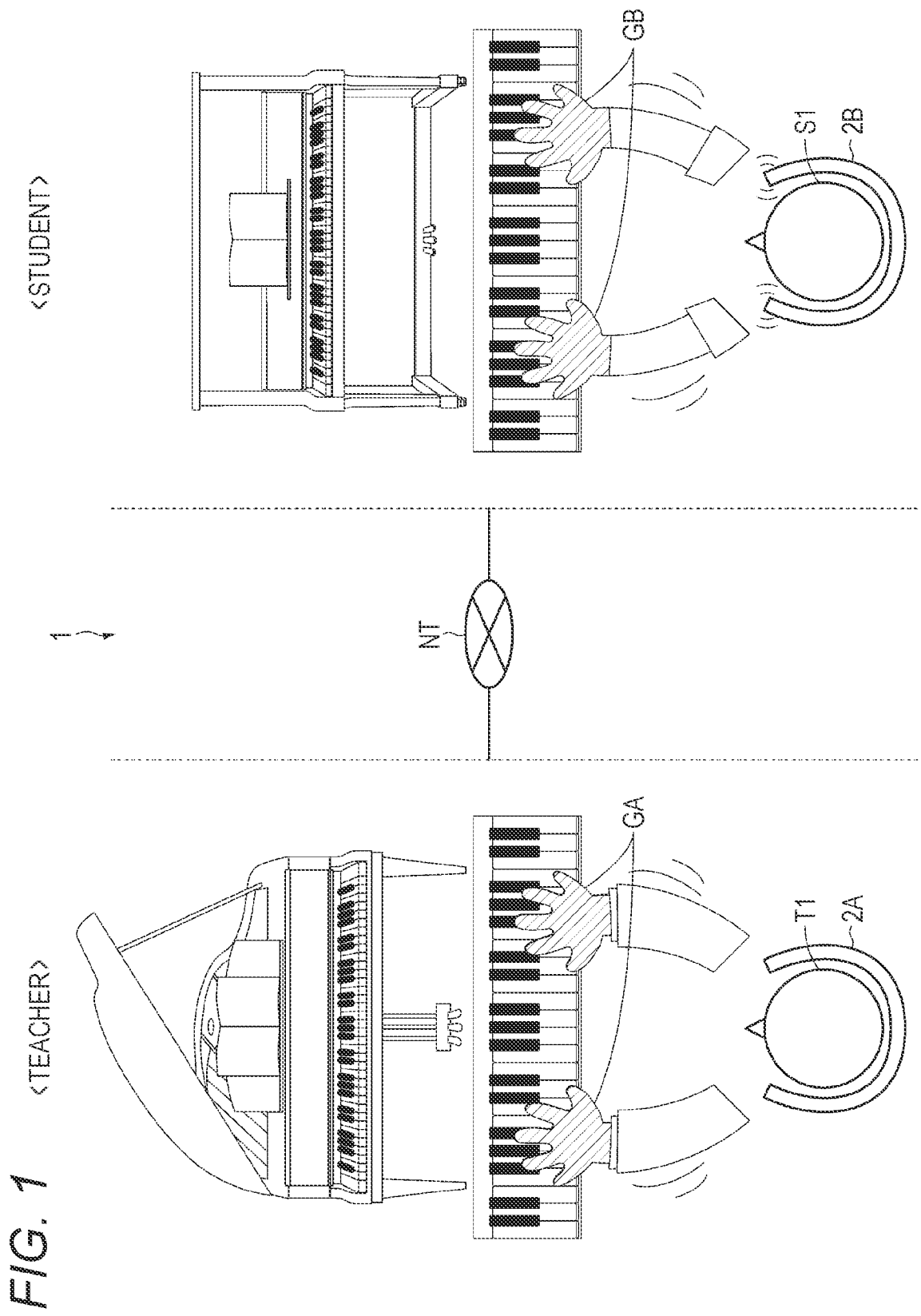
FIG. 1 is a diagram referred to when an overview of an embodiment is described.

Hereinbelow, embodiments and the like of the present disclosure will be described with reference to the drawings. Note that description will be provided in the following order.

<Background>
<First Embodiment>
<Second Embodiment>
<Third Embodiment>
<Modification Examples>

The embodiments and the like described below are preferred specific examples of the present disclosure, and the contents of the present disclosure are not limited to these embodiments and the like.

BACKGROUND

First, a background of the present disclosure will be described. In recent years, a remote lesson using a video chat tool has become widespread along with an increase in speed of the Internet, improvement in image quality and sound quality of the video chat tool, and widespread use of a device such as a smartphone. In an early stage, the content of the remote lesson was English conversation in most cases, but in recent years, a musical instrument lesson, for example, as well as an English conversation lesson, has been conducted. As for the type of the musical instrument, a remote lesson of various types of musical instrument has been conducted including not only keyboard instruments such as a piano but also stringed instruments such as a guitar and wind instruments such as a flute.

Such a remote lesson of the musical instrument is advantageous in that the expense is lower than that for a face-to-face lesson in which a teacher and a student meet for the lesson, and in that time can be saved because the student does not need to go to a lesson place at which the teacher is present. Also, the remote lesson allows the student to efficiently learn the performance of a desired musical instrument without going to the lesson place. In some cases, it is possible to take a lesson from a well-known teacher. It is expected that remote lessons of a musical instrument with such various advantages will continue to increase in the future.

Meanwhile, in a remote lesson of a musical instrument, the student listens to the teacher's instructions using headphones and earphones and imitates how the teacher is playing displayed on a display or a screen to proceed with practice of the performance. Also, in a case where the student reviews the performance by himself/herself, he/she listens to the recording of the teacher's performance and remembers the instructions to proceed with practice of the performance.

In practicing playing a musical instrument that involves keystrokes, such as a piano, it is important to learn the proper amount of finger force (way to apply strength/weakness). The reason for this is that the strength/weakness of the sounds directly represents the expression of the musical piece. Applying proper strength/weakness leads to good expression on the musical piece. In a normal face-to-face lesson, the student learns how much force the teacher is using for keystrokes with which finger by asking the teacher directly to guide the student's fingers and looking closely at the teacher's fingers carefully, for example.

On the other hand, in a remote lesson, there is a problem in which it is difficult for the student to figure out strength/weakness of keystrokes performed by the teacher and to learn the strength/weakness of the keystrokes. Since the student is in a remote place, it is not possible for the student to ask the teacher directly to guide the student's fingers and teach the strength/weakness and to look at the teacher's hand closely. Therefore, it is necessary to learn the strength/weakness of the keystrokes by listening to the loudness of the performance sounds generated when the teacher has played and listening to the teacher's oral explanation.

However, in a video chat tool, since signal processing such as normalization, noise reduction, and gain control is applied to sound data corresponding to the teacher's performance, for example, there is a possibility that the way the student hears the sounds is not always the same. For this reason, the sounds heard from the video chat tool are often not suitable as a sample for learning how to apply strength/weakness of keystrokes. Also, since the amount of force is a subjective matter for each person, it is often difficult for the student to figure out the amount of force even when the teacher gives an oral explanation. Such problems can also occur when the student reviews and plays alone. As described above, while the remote lesson is excellent in convenience, the remote lesson also has disadvantages as compared with the face-to-face lesson. The embodiments of the present disclosure made in consideration of the above respects will be described in detail below.

First Embodiment

Overview

First, an overview of the embodiment will be described with reference to FIG. 1. In the embodiment, a remote lesson of a musical instrument, specifically a piano, will be described as an example. As illustrated in FIG. 1, in a remote lesson system (remote lesson system 1) in which a remote lesson of a piano is performed, at least one student is present per teacher. In the example illustrated in FIG. 1, although one student S1 is present per teacher T1, a plurality of students S1 may be present.

In the remote lesson system 1, the teacher T1 and the student S1 use information processing apparatuses having the same configurations. The information processing apparatus that the teacher T1 uses is referred to as an information processing apparatus 2A. The information processing apparatus that the student S1 uses is referred to as an information processing apparatus 2B. Note that there may be a difference in configuration between the information processing apparatuses 2A and 2B.

Also, in the remote lesson system 1, the teacher T1 and the student S1 wear gloves having the same configurations and play the piano. The glove that the teacher T1 uses is referred to as a glove GA. The glove that the student S1 uses is referred to as a glove GB. Note that there may be a difference in configuration between the gloves GA and GB.

The glove GA includes a displacement sensor provided for each finger, for example. The displacement sensor includes a strain gauge or the like that outputs voltage in accordance with the movement (displacement) of the finger, for example. The same applies to the glove GB.

The information processing apparatuses 2A and 2B are connected via a network NT to enable various kinds of data to be transmitted and received (note that FIG. 1 schematically illustrates a state in which the information processing apparatuses 2A and 2B are connected via the network NT). In the network NT according to the embodiment, a wireless transmission line is assumed, but a wired transmission line may be used. Specifically, the network NT includes a public line network such as the Internet, any of various local area networks (LANs) including Ethernet (registered trademark), a wide area network (WAN), and the like. Also, the network NT may be a dedicated line network such as an Internet protocol-virtual private network (IP-VPN) or a near field wireless communication network such as Bluetooth (registered trademark).

Note that, depending on the content of each of the embodiments, there may be cases where the teacher T1 and the student S1 do not necessarily have to wear the information processing apparatuses 2A and 2B and the gloves GA and GB. These cases will be described in each of the embodiments.

[Information Processing Apparatus]

Example of Appearance of Information Processing Apparatus

Figure 2:
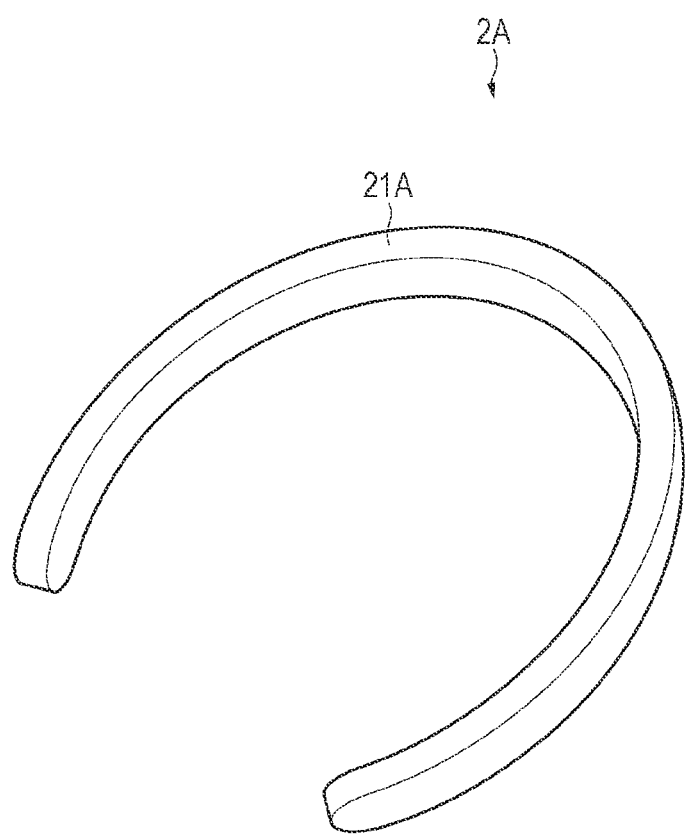
FIG. 2 is a perspective view illustrating an example of appearance of an information processing apparatus according to the embodiment.

Next, the information processing apparatus according to the embodiment will be described. FIG. 2 is a perspective view illustrating an example of appearance of the information processing apparatus 2A according to the embodiment. The information processing apparatus 2A is a wearable device that can be attached to and detached from a human body. The information processing apparatus 2A is a so-called neckband type wearable device that is worn around the user's neck and used, for example. Specifically, the information processing apparatus 2A includes a housing 21A formed in a partially opened ring shape (C shape). The information processing apparatus 2A is worn by the user so that the vicinity of the center of the housing 21A rests behind the user's neck, in other words, the opened portion is located the user's front side. The housing 21A has slight flexibility so that the opened portion can be expanded and can accommodate various neck thicknesses.

A microphone serving as a sound pick-up unit and a loudspeaker are provided at appropriate positions in the housing 21A of the information processing apparatus 2A. For example, microphones and loudspeakers are provided near both ends of the housing 21A. The information processing apparatus 2A according to the embodiment can pick up a sound by means of the microphones and can reproduce a sound by means of the loudspeakers.

Example of Internal Configuration of Information Processing Apparatus

FIG. 3 is a block diagram illustrating an example of an internal configuration of the information processing apparatus 2A. As illustrated in FIG. 3, the information processing apparatus 2A includes a control unit 201A, a storage unit 202A, an angular velocity sensor 203A, an acceleration sensor 204A, a geomagnetic sensor 205A, a global positioning system (GPS) 206A, and a loudspeaker 207A, a communication unit 208A, a microphone 209A, and a vibration unit 210A, for example.

The control unit 201A includes a central processing unit (CPU) or the like, for example, and comprehensively controls the respective units of the information processing apparatus 2A. Functional blocks included in the control unit 201A and a specific example of processing performed by the control unit 201A will be described below.

The storage unit 202A includes a non-volatile memory in which various programs and various kinds of data are fixedly stored and a volatile memory used as an operation region for the control unit 201A. The above programs may be read from a portable recording medium such as an optical disk and a semiconductor device or may be downloaded from a server device on a network.

The angular velocity sensor 203A detects angular velocity around the three axes (XYZ axes) of the information processing apparatus 2A and outputs information regarding the detected angular velocity around the three axes to the control unit 201A. The acceleration sensor 204A detects acceleration in the direction of the three axes of the information processing apparatus 2A and outputs information regarding the detected acceleration in the direction of the three axes to the control unit 201A. The geomagnetic sensor 205A detects angles (azimuth) around the three axes of the information processing apparatus 2A and outputs information regarding the detected angles (azimuth) to the control unit 201A. In the present embodiment, although the number of axes to be detected in each of the sensors is three, the number of axes to be detected may be one or two.

The GPS 206A receives electric waves from a GPS satellite, detects positional information of the information processing apparatus 2A, and outputs this positional information to the control unit 201A.

One loudspeaker 207A is provided at a lower position of each opening (not illustrated) provided in the housing 21A. These loudspeakers 207A reproduce a sound in response to control by the control unit 201A. Note that, although the number of the loudspeakers 207A is two, the number of the loudspeakers 207A is not particularly limited.

The communication unit 208A communicates with other devices in a wireless or wired manner. The communication unit 208A includes an antenna, a modulation/demodulation circuit, and the like in accordance with a communication method.

The microphone 209A picks up a sound around the information processing apparatus 2A. For example, the microphone 209A picks up piano performance sounds of the teacher T1. Sound data of the picked-up performance sounds (hereinbelow referred to as performance data as needed) is supplied to the control unit 201A.

The vibration unit 210A is a device housed inside the housing 21A and vibrating in response to control by the control unit 201A.

Note that, in the embodiment, the information processing apparatus 2A is configured to acquire output of the displacement sensor included in the glove GA. For example, the information processing apparatus 2A is connected to the glove GA in a wired or wireless manner and is configured to cause the output of the displacement sensor to be supplied to the information processing apparatus 2A through communication.

(Functional Blocks of Control Unit)

FIG. 4 is a diagram illustrating an example of functional blocks of the control unit 201A. The control unit 201A according to the embodiment includes as functional blocks a vibration feedback information generation unit 221A, a difference calculation unit 222A, a difference feedback information generation unit 223A, and a feedback control unit 224A, for example. Specific operation examples of the vibration feedback information generation unit, the difference calculation unit, the difference feedback information generation unit, and the feedback control unit will be described below. Note that the control unit 201A is configured to execute an appropriate function such as analog to digital (A/D) conversion in addition to the above-mentioned functional blocks.

(Vibration Unit)

Figure 5:
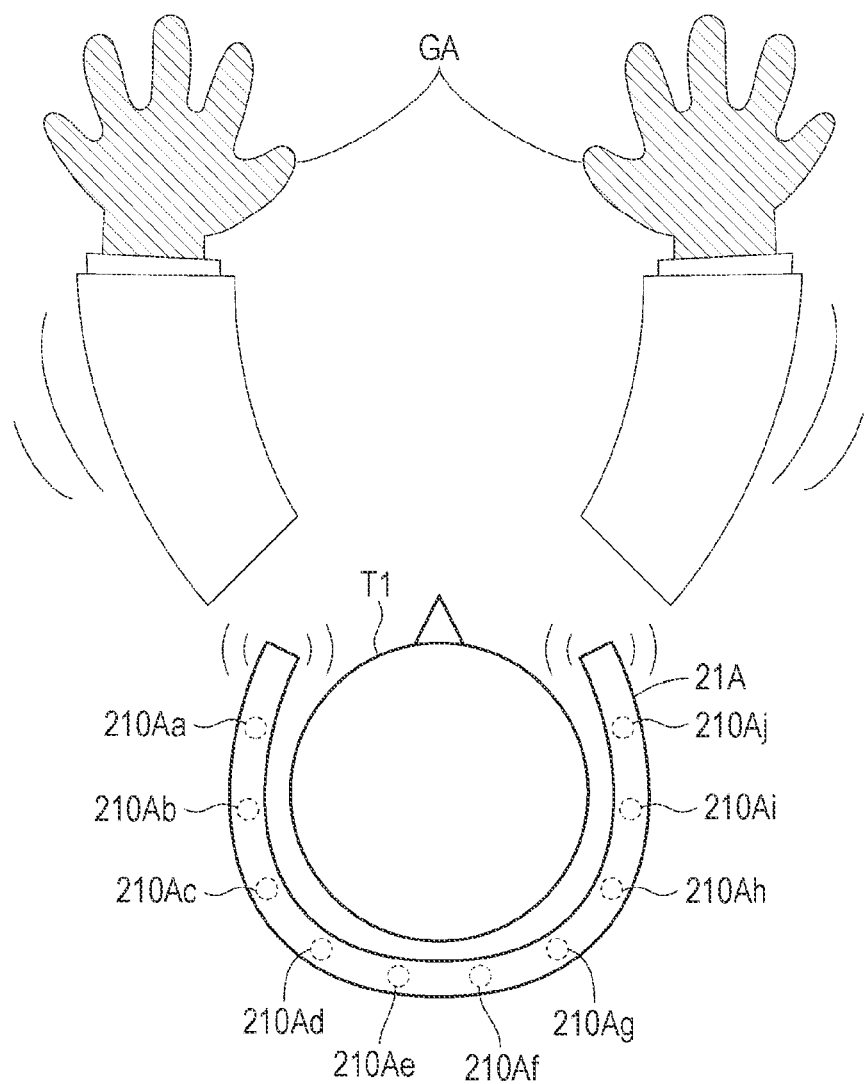
FIG. 5 is a diagram for describing an arrangement example of a plurality of vibration devices included in a vibration unit according to the embodiment.

Here, a specific example of the vibration unit 210A will be described. The vibration unit 210A includes a plurality of vibration devices, for example. The vibration device includes an actuator or the like that moves in accordance with applied voltage, for example. FIG. 5 is a diagram for describing an arrangement example of the plurality of vibration devices included in the vibration unit 210A. The vibration unit 210A includes the plurality of vibration devices arranged to correspond to arrangement of the fingers, for example. More specifically, the vibration unit 210A includes ten vibration devices (vibration devices 210Aa, 210Ab, 210Ac ... 210Aj) corresponding to ten fingers. As illustrated in FIG. 5, in a state where the information processing apparatus 2A is worn, the vibration devices 210Aa, 210Ab, 210Ac ... 210Aj are arranged in order from the left side to the right side of the housing 21A.

Each of the vibration devices corresponds to each of the fingers. For example, the vibration device 210Aa corresponds to the little finger of the left hand. Also, the vibration device 210Ab corresponds to the ring finger of the left hand. Similarly, each of the other vibration devices corresponds to a predetermined finger. The direction of the finger positions and the arrangement direction of the vibration devices correspond to each other, which enables the user to easily figure out, when any vibration device vibrates, to which finger the vibration corresponds.

The configuration example of the information processing apparatus 2A has been described above, and in the embodiment, the information processing apparatus 2B also has a similar configuration. Note that, in the configuration of the information processing apparatus 2B, a reference sign is provided by replacing "A" in the reference sign provided in the configuration of the information processing apparatus 2A with "B". For example, while the control unit included in the information processing apparatus 2A is the control unit 201A, the control unit included in the information processing apparatus 2B is the control unit 201B.

Example of Processing Performed in Remote Lesson System

Next, an example of processing performed in the remote lesson system 1 according to the first embodiment will be described with reference to FIGS. 6, 7A, 7B, 8A, 8B, 8C, and 9.

Example of Processing in System on Teacher Side

First, an example of processing performed in the system on the teacher T1 side will be described. As illustrated in FIG. 6, the teacher T1 plays the piano in the system on the teacher T1 side. The performance sounds of the piano are picked up by the microphone 209A, and the picked-up sound data is A/D converted by the control unit 201A, for example, to cause performance data PD to be generated. On the other hand, as the performance progresses, sensor data is output from the displacement sensor included in the glove GA, and the sensor output is supplied to the information processing apparatus 2A. The sensor data is then A/D converted by the control unit 201A of the information processing apparatus 2A to cause sensor data SD1 to be generated.

The performance data PD and the sensor data SD1 are supplied to the communication unit 208A. The communication unit 208A operates in response to control by the control unit 201A, and the performance data PD and the sensor data SD1 are transmitted to the system on the student S1 side as a result of the operation of the communication unit 208A. Note that, in the present embodiment, although the sensor data SD1 is transmitted via the information processing apparatus 2A, the sensor data SD1 may be transmitted to the system on the student S1 side by a different device from the information processing apparatus 2A.

Example of Processing in System on Student Side

Next, an example of processing in the system on the student S1 side will be described. The performance data PD and the sensor data SD1 transmitted from the system on the teacher T1 side are received in the communication unit 208B of the information processing apparatus 2B on the student S1 side. Of the received data, the performance data PD is D/A (digital to analog) converted by the control unit 201B, is then supplied to the loudspeaker 207B, and is reproduced from the loudspeaker 207B. Note that the performance data PD may be stored in the storage unit 202B and can be reproduced at an appropriate timing (for example, a time when the student S1 reviews the piano performance by himself/herself).

On the other hand, the sensor data SD1 received in the communication unit 208B is supplied to the vibration feedback information generation unit 221B of the control unit 201B. The vibration feedback information generation unit 221B generates vibration feedback information that provides feedback by means of vibration on the basis of information based on keystrokes of the musical instrument. Here, the information based on keystrokes of the musical instrument includes information indicating strength/weakness of keystrokes of the musical instrument.

An operation example of the vibration feedback information generation unit 221B will be described with reference to FIGS. 7A and 7B. Note that the operation example of the vibration feedback information generation unit 221B described below can also be applied to the vibration feedback information generation unit 221A.

In the embodiment, strength/weakness of keystrokes of the musical instrument is defined as velocity of the finger with which keying is performed to produce a sound. As illustrated in FIGS. 7A and 7B, displacement data representing strength/weakness of keystrokes of each finger on the teacher T1 side is converted into vibration data. First, the sensor data pieces SD1, which are values of the displacement sensor included in the glove GA, are arranged in a time-series manner and are differentiated to be treated as values representing the velocity of the finger to derive time-series data of the values (refer to FIG. 7A). The time-series data representing the velocity of the finger corresponds to an example of information indicating strength/weakness of keystrokes of the musical instrument. From the derived time-series data for the velocity, time-series data for vibration level is generated (refer to FIG. 7B). The velocity and the vibration level are assumed to have a proportional relationship, for example, and are normalized on the basis of an approximate possible maximum velocity value and a maximum vibration value determined by limitation of the vibration device of the vibration unit 210B. The vibration feedback information generation unit 221B performs the processing for the respective fingers (ten fingers) to generate the time-series data for vibration level corresponding to the respective fingers. This time-series data corresponds to an example of vibration feedback information. The vibration feedback information is supplied to the feedback control unit 224B.

The feedback control unit 224B takes necessary control so that feedback based on the vibration feedback information is provided. Specifically, the feedback control unit 224B drives and vibrates any appropriate vibration device of the vibration unit 210B on the basis of the vibration feedback information. For example, in a case where the vibration feedback information indicates vibration of the right little finger having a predetermined level, the feedback control unit 224B applies voltage having a predetermined level to the vibration device 210Bj to reach the vibration level indicated in the vibration feedback information. As a result, the vibration device 210Bj vibrates at the level indicated in the vibration feedback information.

With the above-mentioned processing, the following remote lesson mode can be achieved, for example. The student S1 acquires the performance data PD and the sensor data SD1 from the system on the teacher T1 side. The student S1 gives an instruction for reproducing the performance data PD at an appropriate timing in a state of wearing the information processing apparatus 2B. In response to the reproduction instruction, the control unit 201B of the information processing apparatus 2B worn by the student S1 performs processing for reproducing the performance data PD and processing for vibrating the vibration unit 210B.

The performance sounds of the teacher T1 are reproduced from the loudspeaker 207B in response to the processing for reproducing the performance data PD, and any appropriate vibration device vibrates. This vibration is transmitted to the body of the student S1 wearing the information processing apparatus 2B. As a result, the student S1 can listen to the performance sounds of the teacher T1 and can recognize (sense) the finger used by the teacher T1 and the strength of the keystroke when the teacher T1 strikes the sound key. Since the strength of the keystrokes, which is conventionally difficult to figure out only by sounds, is fed back by vibration, the student S1 can see the appropriate strength/weakness of the keystrokes. Note that, together with the vibration, a sound effect proportional to the vibration level may be reproduced.

Although the student S1 can recognize the appropriate strength/weakness of the keystrokes in this manner, the student S1 has difficulty in recognizing whether or not strength/weakness of keystrokes when he/she actually plays is appropriate. Under such circumstances, in the present embodiment, feedback is further given as to whether or not the strength/weakness of the keystrokes when the student S1 actually plays is appropriate. This respect will be described below.

For example, as illustrated in the system on the student S1 side in FIG. 6, the student S1 wears the glove GB and plays the piano. Note that, the student S1 may or may not wear the information processing apparatus 2B in performance. Sensor data SD2, which is an output of the displacement sensor included in the glove GB and is generated by A/D conversion by the control unit 201B, is input into the control unit 201B of the information processing apparatus 2B, more specifically, the difference calculation unit 222B. Also, the sensor data SD1 received via the communication unit 208B is input into the difference calculation unit 222B.

An operation example of the difference calculation unit 222B will be described with reference to FIGS. 8A, 8B, and 8C. The difference calculation unit 222B converts the sensor data SD1 into velocity data. The conversion method is similar to the above-mentioned method, and the values of the sensor data SD1 are arranged in a time-series manner and are differentiated to derive time-series data for the velocity. The time-series data for the velocity is referred to as time-series data TD1. As described above, in the embodiment, since strength/weakness of keystrokes of the musical instrument is defined as velocity of the finger with which keying is performed to produce a sound, the time-series data TD1 for the velocity of the finger corresponds to an example of first data based on the strength/weakness of the keystrokes of the musical instrument. A specific example of the time-series data TD1 (for example, time-series data for the velocity of keystrokes of the left little finger) is schematically illustrated in FIG. 8A.

Also, the difference calculation unit 222B converts the sensor data SD2 into velocity data. The conversion method is similar to the above-mentioned method used for the sensor data SD1, and the values of the sensor data SD2 are arranged in a time-series manner and are differentiated to derive time-series data for the velocity. The time-series data for the velocity is referred to as time-series data TD2. As described above, in the embodiment, since strength/weakness of keystrokes of the musical instrument is defined as velocity of the finger with which keying is performed to produce a sound, the time-series data TD2 for the velocity of the finger corresponds to an example of second data, which differs from the first data, based on the strength/weakness of the keystrokes of the musical instrument. A specific example of the time-series data TD2 (for example, time-series data for the velocity of keystrokes of the left little finger) is schematically illustrated in FIG. 8B.

The difference calculation unit 222B compares the time-series data TD1 with the time-series data TD2, and in a case where the teacher T1 and the student S1 are keying with the same fingers at almost equal velocity in a certain period of time, the difference calculation unit 222B determines that the teacher T1 and the student S1 are keying at equal velocity, that is, with equal strength, and determines that the strength of the keystrokes of the student S1 is appropriate. For example, in a case of the time-series data TD1 and TD2 illustrated in FIGS. 8A and 8B, and in a case where a timing difference is within a predetermined threshold value tht ($|t1-t2|<$tht), and where the teacher T1 and the student S1 are keying with the same fingers at almost equal velocity within a threshold value thv ($|v1-v2|<$thv), the difference calculation unit 222B determines that the teacher T1 and the student S1 are keying at equal velocity and determines that the strength of the keystrokes of the student S1 is appropriate.

The difference calculation unit 222B continuously performs the above-mentioned processing and generates information based on strength/weakness of keystrokes of the musical instrument, specifically, dissimilarity data DD, which is time-series data for portions at which keying is not performed at equal velocity. The dissimilarity data DD is generated for all fingers. For example, as illustrated in FIG. 8C, the difference calculation unit 222B generates the dissimilarity data DD in a case where keying is not performed at equal velocity. Specifically, the difference calculation unit 222B sets d=1 in a case where the student S1 has higher velocity of the finger than the teacher T1, sets d=−1 in a case where the student S1 has lower velocity of the finger than the teacher T1, and sets d=0 in the other cases. The difference calculation unit 222B outputs the generated dissimilarity data DD to the difference feedback information generation unit 223B.

Figure 9:
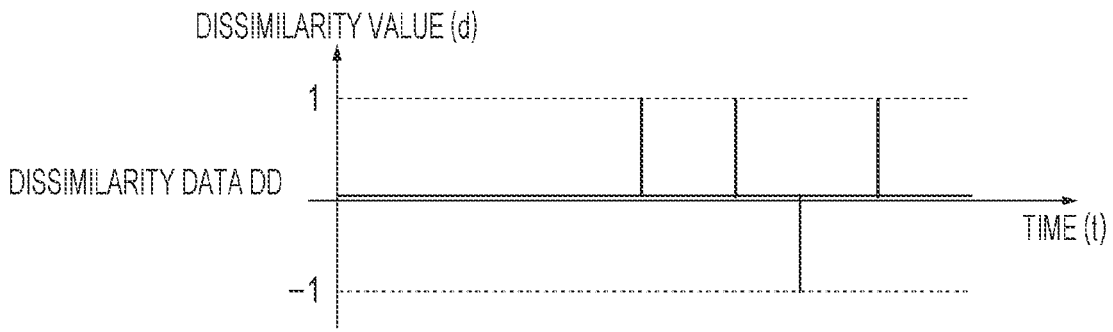
FIG. 9 is a diagram illustrating an example of the dissimilarity data.

The difference feedback information generation unit 223B generates difference feedback information that provides feedback in accordance with the difference, that is, the dissimilarity data DD. As illustrated in FIG. 9, the dissimilarity data DD indicates that a pulse is output in a case where the dissimilarity between the time-series data TD1 and TD2 is equal to or more than a predetermined level. The larger number of pulses in the dissimilarity data DD for all fingers means that the number of dissimilarities in strength/weakness of keystrokes between the teacher T1 and the student S1 is larger, and that the number of the student's mistakes in strength/weakness of keystrokes is larger. Conversely, the smaller number of pulses in the dissimilarity data DD for all fingers means that the number of dissimilarities in strength/weakness of keystrokes between the teacher T1 and the student S1 is smaller, and that the number of the student's mistakes in strength/weakness of keystrokes is smaller.

The difference feedback information generation unit 223B outputs the difference feedback information corresponding to the number of pulses, in other words, the number of mistakes on the student side, and the output timing of the pulses. The feedback control unit 224B then executes control for providing specific feedback indicated in the difference feedback information. In the present embodiment, feedback is provided by means of at least one of reproduction of a message (Text to Speech (TTS)) or vibration in accordance with the difference feedback information.

For example, feedback is provided in the following mode.

The system on the student S1 side acquires the performance data PD and the sensor data SD1 in the system on the teacher T1 side. The student S1 plays the piano once. At this time, the difference calculation unit 222B and the difference feedback information generation unit 223B operate as described above to cause the difference feedback information to be generated.

After the performance by the student S1 ends, the feedback control unit 224B provides feedback in accordance with the difference feedback information. In the difference feedback information, the content of a message and reproduction timing of the message are defined, for example. As a specific example, the performance by the student S1 is recorded, and then the recorded performance is reproduced. In accordance with the content indicated in the difference feedback information, the feedback control unit 224B takes control so that, for example, as the performance being reproduced progresses, a message such as "Play a little more strongly about five seconds after the beginning." is generated at a time when d=−1 is output from the dissimilarity data DD, and the message is reproduced from the loudspeaker 207B.

The difference feedback information generation unit 223B may determine the content of the feedback depending on the number of times the difference exceeds the threshold value and generate the difference feedback information corresponding to the content of the determined feedback. The feedback control unit 224B takes control so that a predetermined message is generated and reproduced in accordance with the difference feedback information. For example, in a case where the number of pulses in the dissimilarity data DD is equal to or less than the threshold value, the difference feedback information generation unit 223B generates the difference feedback information for generating and reproducing a compliment message such as "You played well, and you did your best." after the musical piece is played. Also, for example, in a case where the number of pulses in the dissimilarity data DD is more than the threshold value, the difference feedback information generation unit 223B generates the difference feedback information for generating and reproducing a message such as "Practice more." or an encouraging message such as "Do your best next time." and "Let's do our best together." after the musical piece is played. The feedback control unit 224B takes control (for example, the above-mentioned processing for generating and reproducing a message) for providing feedback in accordance with the difference feedback information.

Feedback by means of vibration may be provided in accordance with the difference feedback information. For example, the difference feedback information generation unit 223B generates the difference feedback information for causing the vibration unit 210B to vibrate with predetermined strength after the end of the musical piece depending on the number of pulses in the dissimilarity data DD. For example, the difference feedback information generation unit 223B generates the difference feedback information for causing the vibration unit 210B to vibrate more strongly as the number of pulses is larger, that is, as the number of mistakes is larger. In accordance with the difference feedback information, the feedback control unit 224B takes control so that the vibration unit 210B vibrates with the strength indicated in the difference feedback information.

Note that, in a case where the vibration unit 210B is vibrated in accordance with the difference feedback information, the vibration timings and the like are appropriately set so as not to overlap with each other so that the vibration of the vibration unit 210B based on the above-mentioned vibration feedback information and the vibration of the vibration unit 210B based on the difference feedback information are not indistinguishable.

Note that there may be a case where the performance level of the student S1 is raised due to lessons. Conversely, there may be a case where the performance level of the student S1 is lowered by neglect of lessons. Therefore, the threshold values (the threshold value tht and the threshold value thy) at the time of generating the dissimilarity data DD may be dynamically changeable in accordance with the performance level. For example, in a case where the performance level is raised, the threshold value tht and the threshold value thv may be lowered to raise the difficulty level. Also, the threshold value (number of times) for the number of pulses in the dissimilarity data DD may be dynamically changeable. For example, a condition in which the performance is determined as one based on appropriate strength/weakness of keystrokes in a case where the number of pulses, that is, the number of mistakes is equal to or less than five may be changed to a condition in which the performance is determined as one based on appropriate strength/weakness of keystrokes in a case where the number of mistakes is equal to or less than three. The threshold values for generating the dissimilarity data DD and the threshold value for the number of pulses in the dissimilarity data DD may be set by the information processing apparatus 2A in the system on the teacher T1 side. Subsequently, the settings determined in the information processing apparatus 2A on the teacher T1 side may be supplied to the information processing apparatus 2A on the student S1 side and used. Also, the difference feedback information generation unit 223B may generate the difference feedback information for generating and reproducing a higher compliment message, for example, in a case where the performance based on appropriate strength/weakness of keystrokes is given in a case where the difficulty level is set high.

[Flow of Processing]

Figure 10:
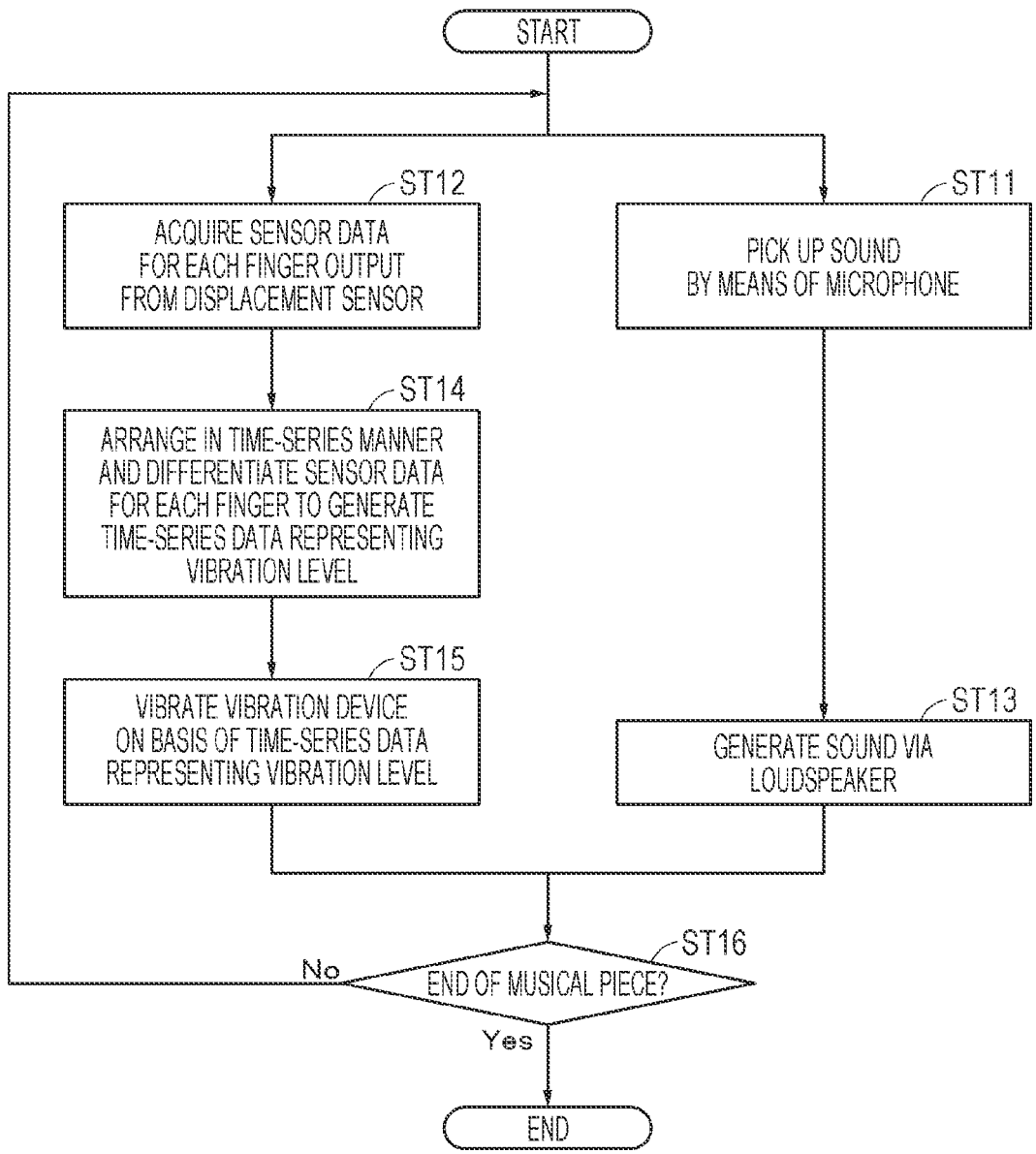
FIG. 10 is a flowchart illustrating a flow of processing in which feedback based on vibration feedback information is provided according to the first embodiment.

Next, a flow of processing performed in the remote lesson system 1 will be described. First, a flow of processing in which feedback based on the vibration feedback information is provided will be described with reference to the flowchart in FIG. 10.

As a prerequisite for the processing, the system on the teacher T1 side and the system on the student S1 side are connected to enable data, commands, and the like to be transmitted and received between the systems, thereby constructing the remote lesson system 1. In the remote lesson system 1, utterance similar to one given in a face-to-face lesson such as "Now, let's start the piano lesson." is given. The utterance given by the teacher T1 is picked up by the information processing apparatus 2A and reproduced by the information processing apparatus 2B on the student S1 side. On the other hand, utterance given by the student S1 is picked up by the information processing apparatus 2B and reproduced by the information processing apparatus 2A on the teacher T1 side.

First, the teacher T1 plays a sample piano performance in a state of wearing the information processing apparatus 2A and the glove GA, for example. The performance sounds generated by the piano performance of the teacher T1 are picked up by the microphone 209A, and the performance data PD is generated (step ST11). Also, the displacement sensor included in the glove GA outputs the sensor data SD1 in accordance with movement of the finger of the teacher T1 during the performance, and the sensor data SD1 is acquired by the information processing apparatus 2A (step ST12). The processing in step ST11 and the processing in step ST12 are performed in parallel during the performance of the teacher T1.

The performance data PD and the sensor data SD1 are transmitted to the information processing apparatus 2B via the communication unit 208A and received in the communication unit 208B. The performance data PD is converted into analog data by the control unit 201B, is then appropriately amplified, and is reproduced from the loudspeaker 207B (step ST13).

The sensor data SD1 received in the communication unit 208B is supplied to the vibration feedback information generation unit 221B. The vibration feedback information generation unit 221B arranges the sensor data pieces SD1 for each finger in a time-series manner and differentiates the sensor data pieces SD1 to generate time-series data for vibration level (step ST14). The feedback control unit 224B then vibrates the corresponding vibration device of the vibration unit 210B on the basis of the time-series data D1 representing the vibration level (step ST15). As a result, the strength/weakness of the keystrokes of the teacher T1 is replicated on the student S1 side. By using the information processing apparatus 2B, the student S1 can sense the strength/weakness of the keystrokes of the teacher T1.

Subsequently, the control unit 201B determines whether or not the musical piece (the performance of the teacher T1) has ended (step ST16). The control unit 201B determines that the musical piece has ended in a case where there is no input of the performance data PD for a certain period of time, for example. In a case where the musical piece has not ended, the processing returns to steps ST11 and ST12. In a case where the musical piece has ended, the processing ends.

Note that, in the above-mentioned processing, although an example in which the performance sounds corresponding to the performance data PD is reproduced in real time on transmission of the performance data PD and the sensor data SD1 from the information processing apparatus 2A, and in which the vibration based on the sensor data SD1 is fed back to the student S1 in real time, has been described, the present disclosure is not limited to this example. The performance data PD and the sensor data SD1 may temporarily be stored in the storage unit 202B. Thereafter, at an appropriate timing (for example, at a timing when an instruction is given by the teacher T1 or at a timing when the student S1 reviews), the performance data PD and the sensor data SD1 may be read from the storage unit 202B, the performance sounds corresponding to the performance data PD may be reproduced, and the vibration based on the sensor data SD1 may be fed back to the student S1.

Figure 11:
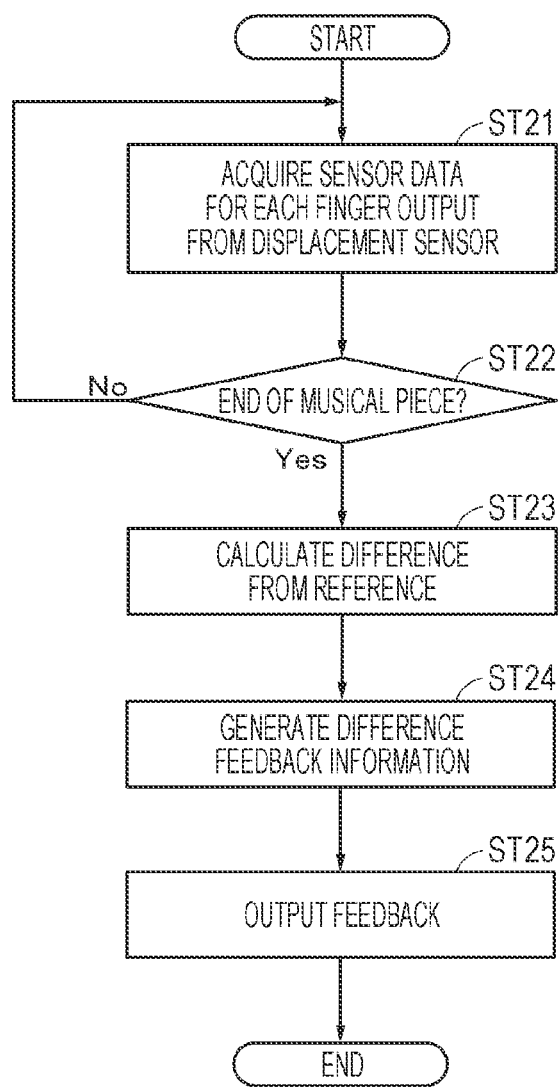
FIG. 11 is a flowchart illustrating a flow of processing in which feedback based on difference feedback information is provided according to the first embodiment.

Next, a flow of processing in which feedback based on the difference feedback information is provided will be described with reference to the flowchart in FIG. 11. Note that description will be provided, assuming as a prerequisite that the sensor data SD1 has already been transmitted to the information processing apparatus 2B.

For example, the student S1 plays the piano in response to an instruction such as "Then, please play." from the teacher T1. The student S1 plays the piano in a state of wearing the glove GB and the information processing apparatus 2B, for example. The displacement sensor included in the glove GB outputs the sensor data SD2 for each finger in accordance with movement of the finger of the student S1 during the piano performance. The sensor data SD2 is acquired in the information processing apparatus 2B (step ST21).

Subsequently, the control unit 201B determines whether or not the musical piece (the performance of the student S1) has ended (step ST22). The control unit 201B determines that the musical piece has ended in a case where there is no input of the performance data during the performance of the student S1 for a certain period of time, for example. In a case where the musical piece has not ended, the processing returns to step ST21. In a case where the musical piece has ended, the processing proceeds to step ST23.

After the performance of the student S1 ends, a difference between the strength/weakness of the keystrokes in the performance of the student S1 and that of the reference is calculated in the difference calculation unit 222B (step ST23). Specifically, the difference calculation unit 222B calculates the difference between the data obtained by arranging the sensor data pieces SD1 for each finger in a time-series manner and differentiating the sensor data pieces SD1, serving as reference data, and the data obtained by arranging the sensor data pieces SD2 for each finger in a time-series manner and differentiating the sensor data pieces SD2 to generate the dissimilarity data DD. The difference calculation unit 222B outputs the dissimilarity data DD to the difference feedback information generation unit 223B.

The difference feedback information generation unit 223B generates the difference feedback information on the basis of the dissimilarity data DD (step ST24). Subsequently, on the basis of the generated difference feedback information, the feedback control unit 224B provides feedback to the student S1 (step ST25). As described above, the feedback based on the difference feedback information is provided by means of reproduction of a message, vibration, or the like.

Examples of Effect

With the first embodiment described above, strength/weakness of keystrokes can be fed back to a user (for example, a student in a remote lesson system) by means of vibration. Accordingly, the user can recognize appropriate strength of keystrokes.

Also, feedback corresponding to a difference resulting from comparison between strength/weakness of keystrokes of a teacher and strength/weakness of keystrokes of a student can be provided. Accordingly, a user (for example, a student) can recognize whether or not the strength of his/her keystrokes is appropriate.

Second Embodiment

Next, a second embodiment will be described. Note that, unless otherwise specified, the matters described in the first embodiment can be applied to the second embodiment. Also, in the second embodiment, the same or homogeneous components to those described in the first embodiment are denoted with the same reference signs, and duplicate description is omitted as appropriate.

Figure 12:
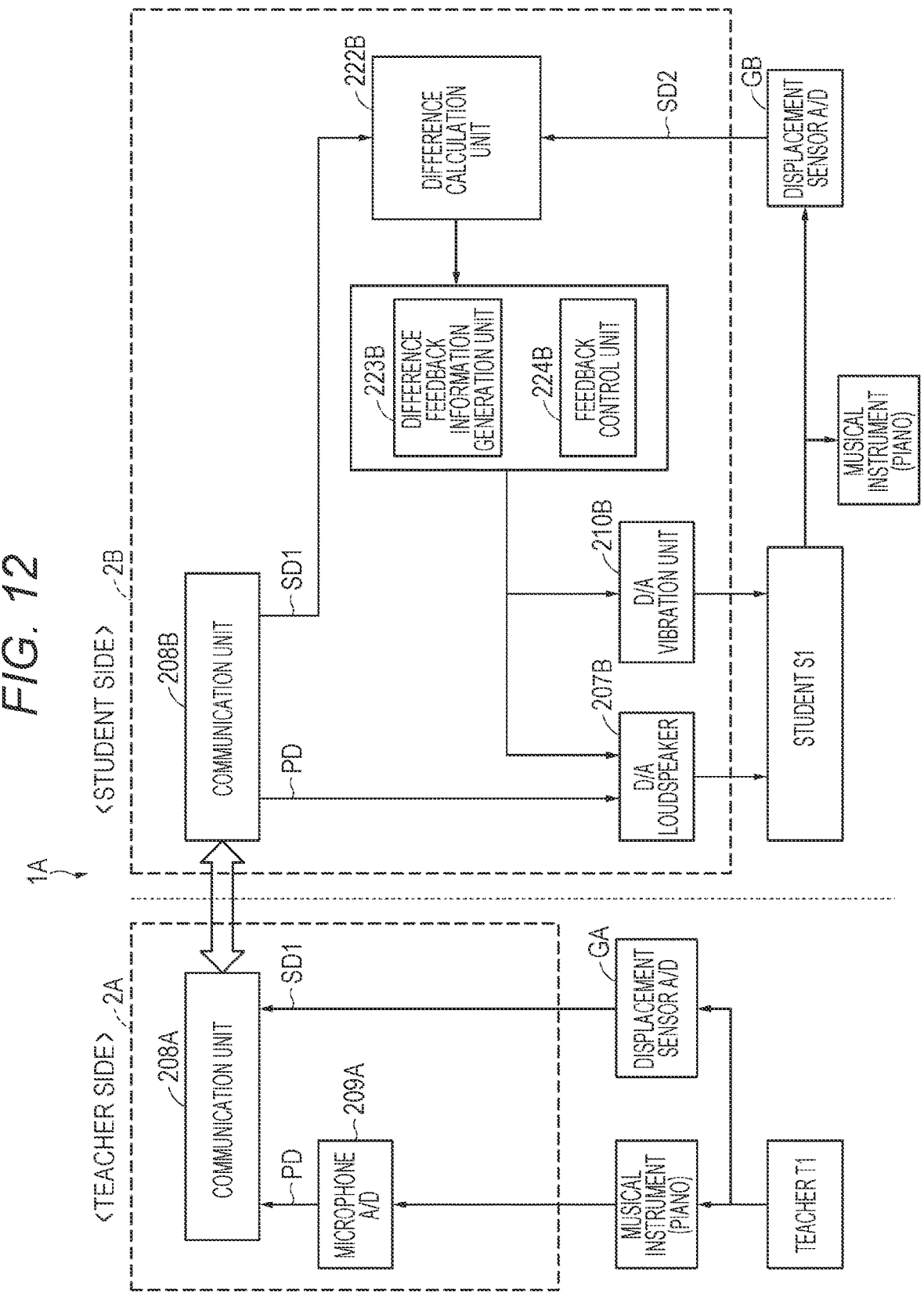
FIG. 12 is a diagram for describing an example of processing performed in a remote lesson system according to a second embodiment.

FIG. 12 is a diagram for describing an example of processing performed in a remote lesson system (remote lesson system 1A) according to the second embodiment. In the second embodiment, when the teacher T1 and the student S1 play the piano substantially simultaneously, the difference feedback information is generated in real time, and the feedback based on the difference feedback information is provided in real time, for example. Note that the performance provided substantially simultaneously means a performance in which the transmission delay, the delay of the processing performed in the information processing apparatuses 2A and 2B, and the like are appropriately corrected, in which the teacher T1 and the student S1 auditorily feel that they are playing simultaneously, and in which a timing difference is equal to or less than a predetermined level.

As described above, the feedback based on the difference feedback information is provided by means of at least one of a message or vibration. In the present embodiment, the feedback is provided by a message and vibration. Therefore, as illustrated in FIG. 12, the present embodiment has a configuration of preventing feedback based on the vibration feedback information from being provided so that the vibration based on the vibration feedback information and the vibration based on the difference feedback information are not indistinguishable. Obviously, as described in the first embodiment, the feedback based on the vibration feedback information may be provided when, for example, the student S1 reviews the piano performance by himself/herself or at another time.

[Flow of Processing]

Figure 13:
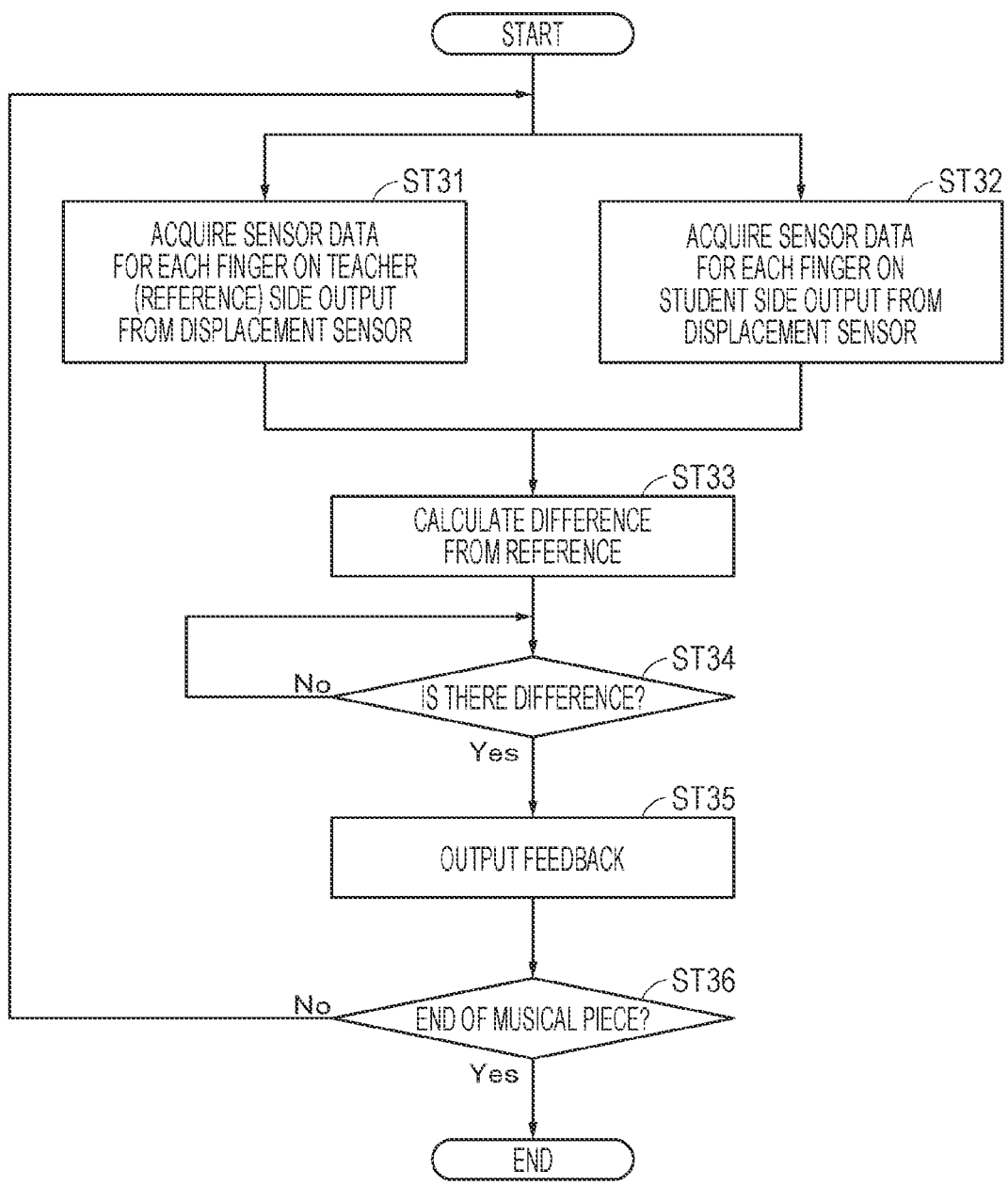
FIG. 13 is a flowchart illustrating a flow of processing in which feedback based on difference feedback information is provided according to the second embodiment.

Next, a flow of processing in which feedback based on the difference feedback information is provided according to the second embodiment will be described with reference to the flowchart in FIG. 13. Note that the piano performance sounds generated by the teacher T1 and the student S1 substantially simultaneously are picked up by the microphones 209A and 209B of the information processing apparatuses 2A and 2B and are transmitted to the counterpart information processing apparatuses. Subsequently, the counterparts' piano performance sounds are reproduced from the loudspeakers 207A and 207B of the information processing apparatuses 2A and 2B, respectively.

For example, the teacher T1 and the student S1 play the piano in response to an instruction such as "Then, let's play together" from the teacher T1. The teacher T1 plays the piano in a state of wearing the glove GA and the information processing apparatus 2A, for example. Also, the student S1 plays the piano in a state of wearing the glove GB and the information processing apparatus 2B, for example.

The displacement sensor included in the glove GA outputs the sensor data SD1 for each finger in accordance with movement of the finger of the teacher T1 (the reference side in the present example) during the piano performance. The sensor data SD1 is acquired in the information processing apparatus 2A (step ST31). The sensor data SD1 is transmitted to the information processing apparatus 2B by the communication unit 208A of the information processing apparatus 2A. The sensor data SD1 is received in the communication unit 208B of the information processing apparatus 2B and is then supplied to the control unit 201B.

Also, the displacement sensor included in the glove GB outputs the sensor data SD2 for each finger in accordance with movement of the finger of the student S1 during the piano performance. The sensor data SD2 is acquired in the information processing apparatus 2B (step ST32).

The difference calculation unit 222B calculates the difference between the strength/weakness of the keystrokes in the performance of the teacher T1 and the strength/weakness of the keystrokes in the performance of the student S1 (step ST33). Specifically, the difference calculation unit 222B calculates the difference between the data obtained by arranging the sensor data pieces SD1 for each finger in a time-series manner and differentiating the sensor data pieces SD1, serving as reference data, and the data obtained by arranging the sensor data pieces SD2 for each finger in a time-series manner and differentiating the sensor data pieces SD2.

The difference feedback information generation unit 223B then determines whether or not there is a difference equal to or more than the threshold value (for example, the difference corresponding to d=1 or d=−1 in the above-mentioned dissimilarity data DD) (step ST34). In a case where there is a difference equal to or more than the threshold value in this determination, the difference feedback information is generated from the difference feedback information generation unit 223B, and the feedback based on the difference feedback information is provided by the feedback control unit 224B (step ST35). In a case where there is no difference equal to or more than the threshold value, no feedback is provided, and the performances by the teacher and student proceed.

For example, in a case where the keystroke of the student S1 is weaker than the keystroke of the teacher T1 by a certain amount or more, the difference feedback information is generated in which feedback in which the vibration device corresponding to the finger performing the keystroke vibrates shortly and weakly is provided and in which a message such as "Press this more strongly." is reproduced. On the other hand, in a case where the keystroke of the student S1 is stronger than the keystroke of the teacher T1 by a certain amount or more, the difference feedback information is generated in which feedback in which the vibration device corresponding to the finger performing the keystroke vibrates shortly and strongly is provided and in which a message such as "Strike this more gently." is reproduced. The feedback based on the difference feedback information is provided by the feedback control unit 224B.

Subsequently, the control unit 201B determines whether or not the musical piece (the performances of the teacher T1 and the student S1) has ended (step ST36). The control unit 201B determines that the musical piece has ended in a case where there is no input of the performance data for a certain period of time, for example. In a case where the musical piece has not ended, the processing returns to steps ST31 and ST32. In a case where the musical piece has ended, the processing ends.

Effects

In the second embodiment described above, in a case where the strength of the keystrokes when the student plays the piano is dissimilar to that of the reference (for example, the strength of the keystrokes of the teacher) by a certain amount or more, the dissimilarity can be fed back in real time.

Third Embodiment

Next, a third embodiment will be described. Note that, unless otherwise specified, the matters described in the first and second embodiments can be applied to the third embodiment. Also, in the third embodiment, the same or homogeneous components to those described in the first and second embodiments are denoted with the same reference signs, and duplicate description is omitted as appropriate.

Overview

First, an overview of the third embodiment will be described. In general, in playing a musical instrument, the more advanced the player is, the more richly the performance sounds are played by playing the musical instrument using his/her whole body, not by just performing the movement of playing the musical instrument. The movement of the whole body is called "getting into the rhythm" or the like, and in performance competitions or the like, the movement of the whole body can be a point for evaluation. The information processing apparatuses 2A and 2B according to the embodiment include the acceleration sensors 204A and 204B. Therefore, in the third embodiment, the acceleration sensors 204A and 204B are used as posture change detection units for detecting a posture change of the player. For example, a difference between a posture change of the teacher T1 and a posture change of the student S1 during the performance is detected, and feedback corresponding to the difference is provided. This enables the student S1 to recognize not only strength of keystrokes but also appropriate body movement during the performance. Hereinbelow, the third embodiment will be described in detail.

Example of Processing

Figure 14:
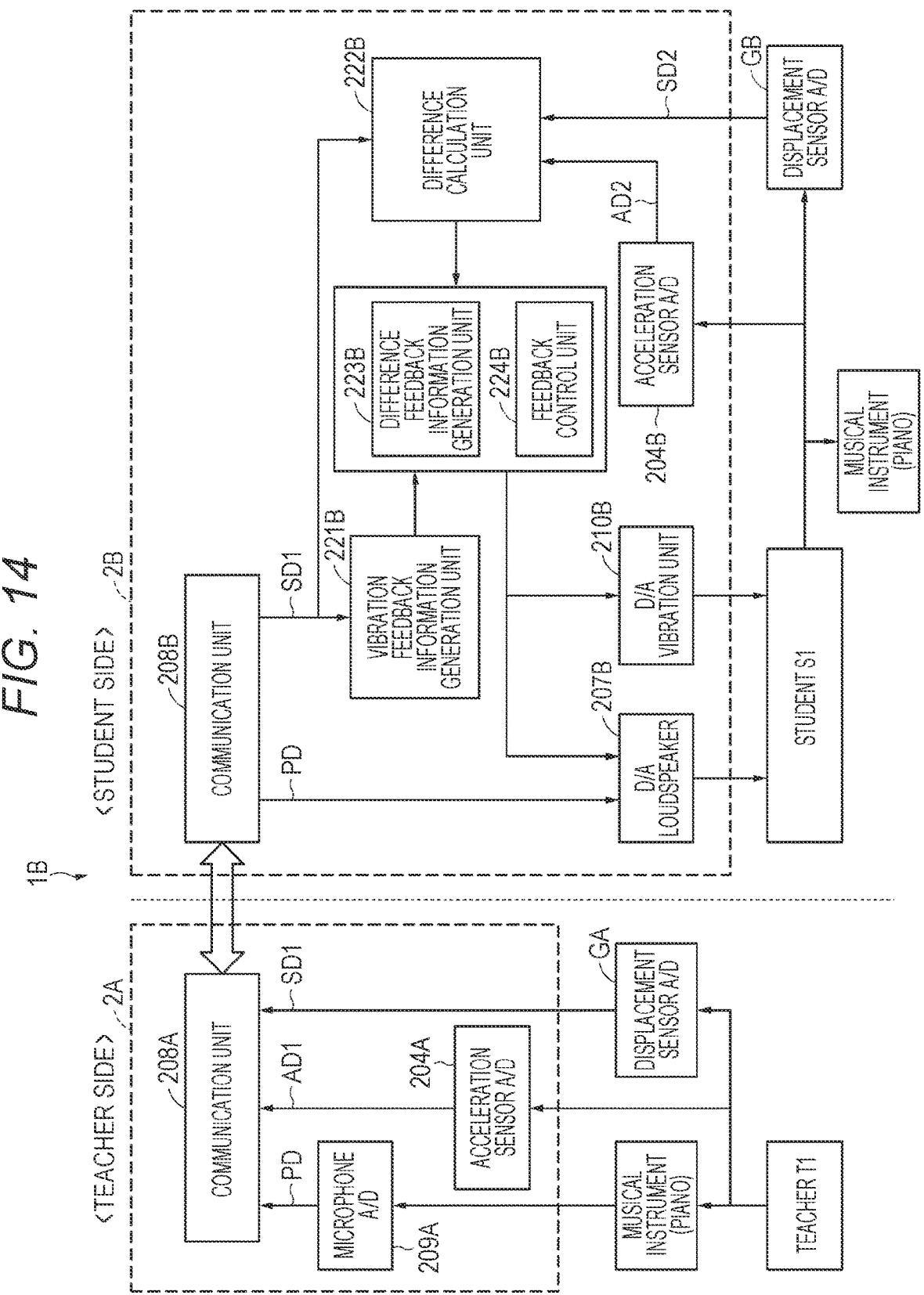
FIG. 14 is a diagram for describing an example of processing performed in a remote lesson system according to a third embodiment.

FIG. 14 is a diagram for describing an example of processing performed in a remote lesson system (remote lesson system 1B) according to the third embodiment. Different points from the above-described embodiment will mainly be described.

A posture change when the teacher T1 plays the piano is detected in the acceleration sensor 204A. Sensor data output from the acceleration sensor 204A is converted into digital data by the control unit 201A to cause acceleration data AD1 to be generated. The acceleration data AD1 is transmitted to the information processing apparatus 2B via the communication unit 208A. The acceleration data AD1 is received in the communication unit 208B of the information processing apparatus 2B and is supplied to the control unit 201B.

Also, a posture change when the student S1 plays the piano is detected in the acceleration sensor 204B. Sensor data output from the acceleration sensor 204B is converted into digital data by the control unit 201B to cause acceleration data AD2 to be generated. The acceleration data pieces AD1 and AD2 are input into the difference calculation unit 222B of the control unit 201B.

The difference calculation unit 222B according to the third embodiment calculates a difference between the acceleration data pieces AD1 and AD2. FIG. 15A schematically illustrates the acceleration data AD1 acquired on the teacher T1 side. FIG. 15B schematically illustrates the acceleration data AD2 acquired on the student S1 side. Deriving a value representing a body posture change from the acceleration data will be considered. A maximum/minimum point of acceleration is a point at which the velocity changes the most and corresponds to a beat part of the body posture change.

The acceleration is treated as a representative value representing the body posture change, and the acceleration data pieces AD1 and AD2 on the teacher T1 side and on the student S1 side are compared to derive a difference from the reference (in the present example, the body posture change of the teacher).

Here, three-axis time-series acceleration data can be expressed by the following Formula 1.

[Formula 1]

$$\vec{a} = (a_x, a_y, a_z) \qquad (1)$$

From the above-described acceleration data, time-series data α of the magnitude of a vector is derived by the following Formula 2. Note that the time-series data of the magnitude of the vector on the teacher T1 side is α1, and the time-series data of the magnitude of the vector on the student S1 side is α2.

[Formula 2]

$$\alpha = |\vec{a}| = \sqrt{a_x^2 + a_y^2 + a_z^2} \qquad (2)$$

The difference calculation unit 222B compares the time-series data α1 with the time-series data α2, and in a case where a timing difference is within a predetermined threshold value tht ($|t1-t2|<tht$), and where the teacher T1 and the student S1 are taking an almost equal posture change ($|\alpha1-\alpha2|<th\alpha$), the difference calculation unit 222B determines that the teacher T1 and the student S1 are taking an equal posture change, that is, playing with equal body movement, and determines that the body movement when the student S1 plays is appropriate.

The difference calculation unit 222B continuously performs the above-mentioned processing and generates dissimilarity data DD1, which is time-series data for portions at which body posture changes are dissimilar. For example, as illustrated in FIG. 15C, the difference calculation unit 222B generates the dissimilarity data DD1 in a case where posture changes are not equal. Specifically, the difference calculation unit 222B sets d=1 in a case where the posture change of the student S1 is more than the posture change of the teacher T1, sets d=−1 in a case where the posture change of the student S1 is less than the posture change of the teacher T1, and sets d=0 in the other cases. In the present example, the dissimilarity data DD1 corresponds to an example of information based on a posture change during performance of a musical instrument. The difference calculation unit 222B outputs the generated dissimilarity data DD1 to the difference feedback information generation unit 223B.

Figure 16:
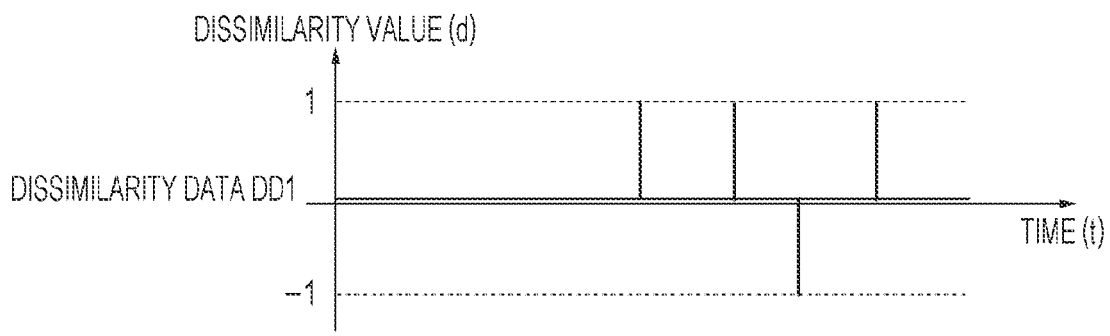
FIG. 16 is a diagram illustrating an example of dissimilarity data regarding a posture change.

The difference feedback information generation unit 223B generates posture change feedback information that provides feedback in accordance with the difference, that is, the dissimilarity data DD1. As illustrated in FIG. 16, the dissimilarity data DD1 indicates that a pulse is output in a case where there is a dissimilarity at a predetermined level or higher between the posture changes of the teacher T1 and the student S1. The larger number of pulses in the dissimilarity data DD1 for all fingers means that the number of dissimilarities in posture change is larger, and that the number of times the posture change on the student S1 side is not appropriate is larger. Conversely, the smaller number of pulses in the dissimilarity data DD1 means that the number of dissimilarities in posture change is smaller, and that the student S1 is playing the piano with an appropriate posture change.

The difference feedback information generation unit 223B outputs the posture change feedback information corresponding to the number of pulses, the generation timing of the pulses, and the like. The posture change feedback information includes the content of feedback and the timing of providing the feedback. The feedback control unit 224B provides feedback based on the posture change feedback information by means of TTS or the like.

For example, feedback is provided in the following mode.

After the performance by the student S1 ends, feedback in accordance with the posture change feedback information is provided. For example, the performance by the student S1 is recorded, and while the recorded performance is being reproduced, feedback in accordance with the posture change feedback information is provided. For example, as a musical piece progresses, the feedback control unit 224B generates a message such as "Get into the rhythm more (move your body more) about five seconds after the beginning." at a timing when d=−1 is output from the dissimilarity data DD1 and reproduces the message from the loudspeaker 207B. Also, for example, as a musical piece progresses, the feedback control unit 224B generates a message such as "Play more calmly about five seconds after the beginning." at a timing when d=1 is output from the dissimilarity data DD1 and reproduces the message from the loudspeaker 207B.

A message depending on the number of pulses in the dissimilarity data DD1 may be reproduced. In a case where the number of pulses is equal to or less than the threshold value, the feedback control unit 224B reproduces a compliment message such as "You were getting into the rhythm well during the performance.", for example. In a case where the number of pulses is more than the threshold value, the feedback control unit 224B reproduces an encouraging message such as "Let's do our best together.", for example.

Feedback based on the posture change feedback information may be provided by means of vibration. For example, in a case where the number of pulses is equal to or less than the threshold value, feedback is provided in a mode in which the vibration of the vibration devices continuously changes from one end side to the other end side. Also, in a case where the number of pulses is more than the threshold value, feedback is provided in a mode in which all of the vibration devices vibrate. Obviously, what kind of vibration is used for feedback can be set as appropriate. Also, as described in the first embodiment, the threshold value and the like may be settable so that the difficulty level changes depending on the level of the student.

[Flow of Processing]

Figure 17:
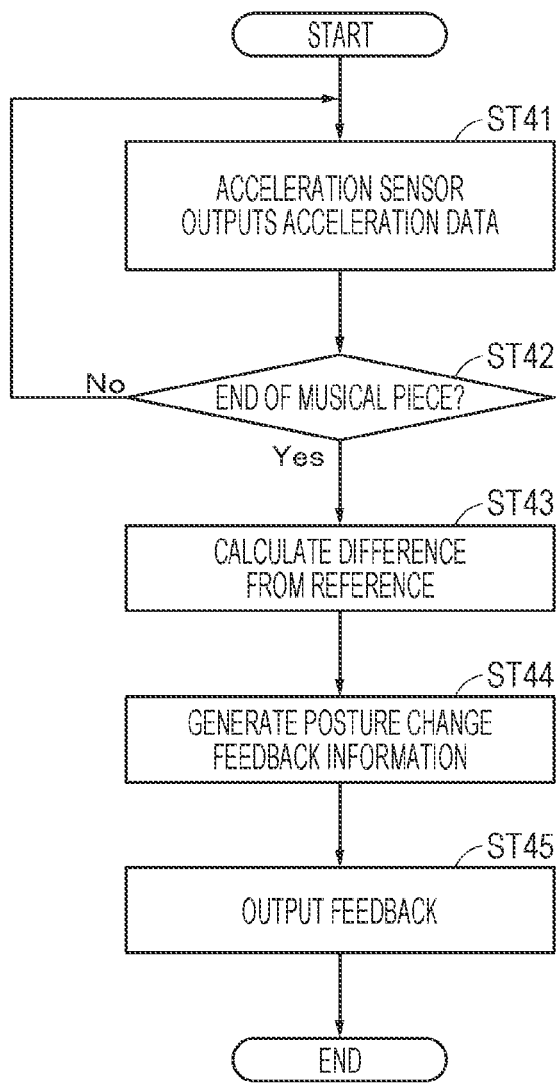
FIG. 17 is a flowchart illustrating a flow of processing in which feedback based on posture change feedback information is provided according to the third embodiment.

Next, a flow of processing in which feedback is provided on the basis of the posture change feedback information will be described with reference to the flowchart in FIG. 17. Note that description will be provided, assuming as a prerequisite that the acceleration data AD1 has already been transmitted to the information processing apparatus 2B.

For example, the student S1 plays the piano in response to an instruction such as "Then, please play." from the teacher T1. The student S1 plays the piano in a state of wearing the glove GB and the information processing apparatus 2B, for example. The acceleration sensor 204B outputs acceleration data in accordance with body movement of the student S1 during the piano performance. This acceleration data is converted into digital data by the control unit 201B, and the acceleration data AD2 is generated (step ST41).

Subsequently, the control unit 201B determines whether or not the musical piece (the performance of the student S1) has ended (step ST42). The control unit 201B determines that the musical piece has ended in a case where there is no input of the performance data for a certain period of time, for example. In a case where the musical piece has not ended, the processing returns to step ST41. In a case where the musical piece has ended, the processing proceeds to step ST43.

After the performance of the student S1 ends, a difference between the posture change of the student S1 during the performance and that of the reference is calculated in the difference calculation unit 222B (step ST43). Specifically, the difference calculation unit 222B calculates a difference between the time-series data $\alpha 1$ based on the acceleration data AD1 and the time-series data $\alpha 2$ based on the acceleration data AD2 to generate the dissimilarity data DD1. The difference calculation unit 222B outputs the dissimilarity data DD1 to the difference feedback information generation unit 223B.

The difference feedback information generation unit 223B generates the posture change feedback information on the basis of the dissimilarity data DD1 (step ST44). Subsequently, on the basis of the generated posture change feedback information, the feedback control unit 224B provides feedback to the student S1 (step ST45). As described above, the feedback based on the posture change feedback information is provided by means of reproduction of a message, vibration, or the like.

Effects

With the third embodiment described above, feedback regarding whether or not the body movement during the performance is appropriate can be provided. Accordingly, the user (for example, a student) can play a musical instrument with appropriate body movement.

Modification Examples

Although the plurality of the embodiments of the present disclosure has specifically been described above, the content of the present disclosure is not limited to the above-described embodiments, and various modifications based on the technical idea of the present disclosure are possible. Hereinbelow, modification examples will be described.

In the above-described embodiments, although the information processing apparatus on the student side calculates the difference, the present disclosure is not limited to this. For example, a smart phone owned by the student or a server device existing on the cloud may calculate the difference. In such a case, the control unit of the information processing apparatus may not include the difference calculation unit. In this manner, the configuration of the information processing apparatus is not limited to the configuration illustrated in the embodiments and can be changed as appropriate.

The above-described respective embodiments can be combined as appropriate. Also, the content to be fed back may be settable as a mode. For example, in a case where a predetermined mode is set, feedback in accordance with a dissimilarity in strength of a keystroke may be provided, and in a case where another mode is set, feedback in accordance with a dissimilarity in posture change may be provided.

In the above-described embodiments, although a configuration in which the teacher also wears the information processing apparatus has been described, the present disclosure is not limited to this. For example, as long as the apparatus can transmit performance data and sensor data to the information processing apparatus on the student side, the apparatus is not necessarily limited to the information processing apparatus described in the embodiments.

In the above-described embodiments, although an example in which various kinds of data are transmitted from the teacher side to the student side has mainly been described, various kinds of data can be transmitted from the student side to the teacher side. For example, sensor data may be transmitted from the information processing apparatus on the student side to the information processing apparatus on the teacher side, and the vibration device in the information processing apparatus on the teacher side may vibrate with strength corresponding to the strength of the keystroke of the student. That is, the teacher may be able to check the strength or the like of the keystroke of the student.

In the above-described embodiments, although an example in which feedback is provided by means of at least one of reproduction of a message or vibration has been described, the present disclosure is not limited to this. For example, feedback by means of display may be provided. The display is made using a display provided on the piano, for example. A display may be provided in the information processing apparatus described in the embodiments. Also, the information processing apparatus described in the embodiments may be provided with a light emitting unit such as a light emitting diode (LED), and feedback may be provided by means of light emission (one mode of display) in which the emission color and emission intensity of the light emitting unit are changed. For example, in a case where strength of a keystroke in the student's performance is appropriate, the LED may emit green light, and in a case where strength of a keystroke in the student's performance is not appropriate, the LED may emit red light. Also, control of feedback based on the vibration feedback information or the difference feedback information generated by the control unit of the information processing apparatus may be performed by a different apparatus from the information processing apparatus (for example, a smart phone or a game device enabling near field wireless communication with the information processing apparatus).

In the above-described embodiments, although an example in which the referred data, that is, various kinds of data obtained in the system on the teacher side, are transmitted via a network has been described, the present disclosure is not limited to this. For example, the data obtained in the system on the teacher side (for example, the sensor data SD1) may be stored in a recording medium and supplied via the recording medium. Examples of such a recording medium include a magnetic storage device such as a hard disk drive (HDD), a semiconductor storage device, an optical storage device, a magneto-optical storage device, and the like. The recording medium may be an accessory added to a book or the like. For example, the recording medium may be added to a book about music lessons. Also, data obtained in the system on the teacher side may be downloadable from a predetermined server device. In this case, for example, only a user who has performed processing such as payment may be able to download the above-mentioned data, or the above-mentioned data may be prepared for each of a plurality of teachers, and the user may be able to download the data of a desired teacher selectively.

In the above-described embodiments, the performance data and the sensor data may be transmitted separately. Further, in the above-described embodiments, although an example in which movement (velocity) of the finger is acquired by the displacement sensor included in the glove has been described, the movement of the finger may be acquired by a unit other than the displacement sensor included in the glove as long as the unit can sense the movement of the finger. An example of such a unit includes a camera that captures the movement of the finger. The camera may be provided in the information processing apparatus. Also, the camera provided in the information processing apparatus may be movable by a mechanism such as a hinge so that the movement of the finger can be captured.

The remote lesson system in each of the above-described embodiments may be operated while the student is viewing and listening to video information regarding the state of the teacher, specifically, video information regarding the teacher's performance, posture, and the like. Also, the vibration feedback or the like may be provided while the student is viewing and listening to the video information. Obviously, the remote lesson system may be operated while the teacher is viewing and listening to the video information regarding the state of the student. The exchange of the video information in the remote lesson system may be performed using a known video chat tool, or a dedicated video chat tool or system suitable for the present technology after the dedicated video chat tool or system is constructed. By using the video information, the state of the counterpart can visually be checked, for example, the student can visually check the state of the teacher, and more effective remote lesson can thus be performed.

The shape of the information processing apparatus described in the embodiments is not limited to the ring shape (neckband type). Other shapes such as a belt type and a watch type may be available.

In the embodiments, although description has been provided using a piano as an example of a musical instrument, a musical instrument whose tone color can change depending on the strength/weakness of the playing action (keying or blowing), such as a drum and a guitar, may be used.

The present disclosure can also be achieved by an apparatus, a method, a program, a system, or the like. For example, a program that performs the function described in the above-described embodiments is downloaded and installed in a device in which the program can be downloaded and which does not have the function described in the embodiments to enable the device to perform the control described in the embodiments. The present disclosure can also be achieved by a server that distributes such a program. Also, the matters described in the respective embodiments and modification examples can be combined as appropriate.

Note that the content of the present disclosure shall not be interpreted in a limited manner by the effects illustrated in the present disclosure.

The present disclosure can also employ the following configurations.

(1)

An information processing apparatus detachable from a human body, including:

a control unit that generates feedback information that provides feedback in accordance with information based on strength/weakness of a keystroke of a musical instrument.

(2)

The information processing apparatus according to (1), in which the information based on strength/weakness of a keystroke of a musical instrument includes information indicating a difference between first data based on strength/weakness of a keystroke of a musical instrument and second data, which differs from the first data, based on strength/weakness of a keystroke of a musical instrument, and the control unit generates difference feedback information that provides feedback in accordance with the difference.

(3)
The information processing apparatus according to (2), in which the control unit calculates the difference between the first data and the second data.

(4)
The information processing apparatus according to (3), in which, in performance of a first musical instrument, the first data based on strength/weakness of a keystroke of the first musical instrument is acquired,
in performance of a second musical instrument, the second data based on strength/weakness of a keystroke of the second musical instrument is acquired, and
the control unit calculates the difference in real time as the performance of the first musical instrument and the second musical instrument, which are performed substantially simultaneously, progresses.

(5)
The information processing apparatus according to (2), in which the control unit determines the content of the feedback depending on the number of times the difference exceeds a threshold value.

(6)
The information processing apparatus according to (5), in which at least one of the threshold value or the number of times is changeable.

(7)
The information processing apparatus according to any one of (2) to (6),
in which the control unit performs control for providing the feedback in accordance with the difference feedback information.

(8)
The information processing apparatus according to (7), in which the feedback is provided by means of at least one of reproduction of a message, vibration, or display.

(9)
The information processing apparatus according to any one of (2) to (8),
in which the first data is supplied via a network.

(10)
The information processing apparatus according to any one of (2) to (8),
in which the first data is supplied via a recording medium.

(11)
The information processing apparatus according to any one of (1) to (10),
in which the information based on strength/weakness of a keystroke of a musical instrument includes information indicating strength/weakness of a keystroke of a musical instrument, and
the control unit generates vibration feedback information that provides feedback by means of vibration on the basis of the information indicating strength/weakness of a keystroke of a musical instrument.

(12)
The information processing apparatus according to (11), further including:
a vibration unit that vibrates on the basis of the vibration feedback information.

(13)
The information processing apparatus according to (12), in which the vibration unit includes a plurality of vibration devices arranged to correspond to arrangement of fingers.

(14)
The information processing apparatus according to any one of (1) to (13),
in which the control unit generates posture change feedback information that provides feedback in accordance with information based on a posture change during performance of a musical instrument.

(15)
The information processing apparatus according to (14), further including:
a posture change detection unit that detects a posture change during performance of a musical instrument.

(16)
The information processing apparatus according to any one of (1) to (15),
in which the information processing apparatus has a neckband type shape.

(17)
The information processing apparatus according to any one of (1) to (16), further including:
a sound pick-up unit.

(18)
The information processing apparatus according to any one of (1) to (17), further including:
a loudspeaker.

(19)
An information processing method in an information processing apparatus detachable from a human body, including:
a control unit's generating feedback information that provides feedback in accordance with information based on strength/weakness of a keystroke of a musical instrument.

(20)
A program causing a computer to execute an information processing method in an information processing apparatus detachable from a human body, the information processing method including:
a control unit's generating feedback information that provides feedback in accordance with information based on strength/weakness of a keystroke of a musical instrument.

REFERENCE SIGNS LIST 2A, 2B Information processing apparatus
201A, 201B Control unit
204A, 204B Acceleration sensor
207A, 207B Loudspeaker
209A, 209B Microphone
210A, 210B Vibration unit
210Aa to 210Aj Vibration device

The invention claimed is:
1. An information processing apparatus, comprising:
a control unit configured to:
acquire, via a network, first data that corresponds to a first velocity of a finger of a first user,
wherein the first velocity is based on one of a strength or a weakness of a keystroke of a first musical instrument of the first user;
acquire second data that corresponds to a second velocity of a finger of a second user, wherein
the second velocity is based on one of a strength or a weakness of a keystroke of a second musical instrument of the second user, and
the information processing apparatus is wearable by the second user;

calculate a difference between the first data and the second data;
generate difference feedback information based on the calculated difference; and
control, based on the generated difference feedback information, provision of feedback to the second user.

2. The information processing apparatus according to claim 1, wherein
the control unit is further configured to:
acquire the first data based on a performance of the first musical instrument;
acquire the second data based on a performance of the second musical instrument; and
calculate the difference in real time as the performance of the first musical instrument and the performance of the second musical instrument progress, and the performance of the first musical instrument and the performance of the second musical instrument are substantially concurrent.

3. The information processing apparatus according to claim 1, wherein the control unit is further configured to determine a content of the feedback based on a number of times the difference exceeds a threshold value.

4. The information processing apparatus according to claim 3, wherein the threshold value is changeable.

5. The information processing apparatus according to claim 1, wherein the provision of the feedback is by at least one of reproduction of a message, vibration, or display.

6. The information processing apparatus according to claim 1, wherein the control unit is further configured to acquire the first data from a recording medium.

7. The information processing apparatus according to claim 1, wherein
the control unit is further configured to generate vibration feedback information that provides feedback by means of vibration, based on the first data.

8. The information processing apparatus according to claim 7, further comprising:
a vibration unit configured to vibrate based on the vibration feedback information.

9. The information processing apparatus according to claim 8, wherein the vibration unit includes a plurality of vibration devices arranged to correspond to arrangement of fingers of the second user.

10. The information processing apparatus according to claim 1, wherein the control unit is further configured to generate posture change feedback information based on a posture change during performance of the second musical instrument.

11. The information processing apparatus according to claim 10, further comprising:
a posture change detection unit configured to detect a posture change during performance of the second musical instrument.

12. The information processing apparatus according to claim 1, wherein the information processing apparatus has a neckband type shape.

13. The information processing apparatus according to claim 1, further comprising a sound pick-up unit.

14. The information processing apparatus according to claim 1, further comprising a loudspeaker.

15. An information processing method, comprising:
in an information processing apparatus that includes a control unit:
acquiring, by the control unit via a network, first data that corresponds to a first velocity of a finger of a first user,
wherein the first velocity is based on one of a strength or a weakness of a keystroke of a first musical instrument of the first user;
acquiring, by the control unit, second data that corresponds to a second velocity of a finger of a second user, wherein
the second velocity is based on one of a strength or a weakness of a keystroke of a second musical instrument of the second user, and
the information processing apparatus is wearable by the second user;
calculating, by the control unit, a difference between the first data and the second data;
generating, by the control unit, difference feedback information based on the calculated difference; and
controlling, by the control unit, based on the generated difference feedback information, provision of feedback to the second user.

16. A non-transitory computer-readable medium having stored thereon, computer-executable instructions which, when executed by a processor of an information processing apparatus, cause the processor to execute operations, the operations comprising:
acquiring, via a network, first data that corresponds to a first velocity of a finger of a first user,
wherein the first velocity is based on one of a strength or a weakness of a keystroke of a first musical instrument of the first user;
acquiring second data that corresponds to a second velocity of a finger of a second user, wherein
the second velocity is based on one of a strength or a weakness of a keystroke of a second musical instrument of the second user, and
the information processing apparatus is wearable by the second user;
calculating a difference between the first data and the second data;
generating difference feedback information based on the calculated difference; and
controlling, based on the generated difference feedback information, provision of feedback to the second user.

* * * * *